US00RE35520E

United States Patent [19]

Darling et al.

[11] E Patent Number: Re. 35,520

[45] Reissued Date of Patent: May 27, 1997

[54] INTERFACING DEVICE FOR A COMPUTER GAMES SYSTEM

[75] Inventors: Richard Darling; Edward A. Carron, both of Leamington Spa; David Darling, Warwickshire, all of England

[73] Assignee: Codemasters Software Company Limited, Southam, England

[21] Appl. No.: 174,700

[22] Filed: Dec. 28, 1993

Related U.S. Patent Documents

Reissue of:

[64] Patent No.: 5,112,051
Issued: May 12, 1992
Appl. No.: 530,617
Filed: May 30, 1990

[30] Foreign Application Priority Data

Jun. 5, 1989 [GB] United Kingdom ..... 8912866
Jul. 12, 1989 [GB] United Kingdom ..... 8915975

[51] Int. Cl.[6] ..... A63F 9/22

[52] U.S. Cl. ..... 463/45

[58] Field of Search ..... 273/148 B, 434, 273/435, 437, 85 G; 364/410; 395/425

[56] References Cited

U.S. PATENT DOCUMENTS

| | | | |
|---|---|---|---|
| Re. 34,161 | 1/1993 | Nakagawa et al. | 273/85 G |
| D. 219,929 | 2/1971 | Herring | D21/1 |
| D. 285,926 | 9/1986 | Kies et al. | D14/114 |
| D. 308,197 | 5/1990 | Inoue | D14/114 |
| D. 311,737 | 10/1990 | Westwood et al. | D14/114 |
| D. 315,577 | 3/1991 | Wang | D21/48 |
| 3,803,470 | 4/1974 | Vosteen | 318/331 |
| 4,028,678 | 6/1977 | Moran | 364/900 |
| 4,028,679 | 6/1977 | Divine | 364/900 |
| 4,028,684 | 6/1977 | Divine et al. | 364/900 |
| 4,051,460 | 9/1977 | Yamada et al. | 364/900 |

(List continued on next page.)

FOREIGN PATENT DOCUMENTS

| | | |
|---|---|---|
| 0268419 | 5/1988 | European Pat. Off. . |
| 2407527 | 5/1979 | France . |
| 1346219 | 2/1974 | United Kingdom . |
| 1491702 | 11/1977 | United Kingdom . |
| 1531528 | 11/1978 | United Kingdom . |
| 1550675 | 8/1979 | United Kingdom . |
| 2115989 | 9/1983 | United Kingdom . |
| 2118809 | 11/1983 | United Kingdom . |
| 2129585 | 5/1984 | United Kingdom . |

OTHER PUBLICATIONS

Logan, Dr. Ian, "Spectrum Micro Drive Book", Melbourne House Publishers, 1983, preface and pp. 5–7.
"Your Sinclair", Nov. 1988 issue, pp. 109, 113 and 114.
"ZAPP! 64", Oct. 1988, preface and p. 65.
"ZAPP! C64 Amiga", Jan. 1989, preface and pp. 58 and 59.
"Mark V Action Replay", Instruction Manual, Datel Electronics, 1988, preface and pp. 1–24.

*Primary Examiner*—Jessica J. Harrison
*Attorney, Agent, or Firm*—Fitzpatrick, Cella, Harper & Scinto

[57] ABSTRACT

An interfacing device for connecting the processing unit of a computer games system to an external data storage medium has a user-operable selection unit for generating a user-selected address and user-selected data. The user-operable selection unit may comprise user-operable switches or electronic latches that are set by a program in response to selections made by the user by means of a joystick, keypad or any other input device. An address comparison unit compares the user-selected address with the addresses from the processing unit, and a data switching device causes the user-selected data to be substituted for data in the storage medium whenever the compared addresses are the same. Instead of a user-operable selection unit, preselected addresses and preselected data may be stored in a ROM, which in one embodiment changes the way the computer interprets external memory and in another changes the computer's internal memory itself.

38 Claims, 19 Drawing Sheets

U.S. PATENT DOCUMENTS

| | | | |
|---|---|---|---|
| 4,095,278 | 6/1978 | Kihara | 364/900 |
| 4,149,027 | 4/1979 | Asher et al. | 104/52 R |
| 4,150,428 | 4/1979 | Inrig et al. | 364/200 |
| 4,218,757 | 8/1980 | Drogichen | 364/900 |
| 4,368,515 | 1/1983 | Nielsen | 364/200 |
| 4,432,067 | 2/1984 | Nielsen | 364/410 |
| 4,456,966 | 6/1984 | Bringol et al. | 364/900 |
| 4,480,835 | 11/1984 | Williams | 273/148 B |
| 4,485,457 | 11/1984 | Balaska et al. | 364/900 |
| 4,763,300 | 8/1988 | Yukawa | 365/52 |
| 4,788,537 | 11/1988 | Potiker | 340/710 |
| 4,799,635 | 1/1989 | Nakagawa | 364/900 |
| 4,844,465 | 7/1989 | Hibino et al. | 273/148 B |
| 4,860,128 | 8/1989 | Nakagawa | 360/60 |
| 4,922,420 | 5/1990 | Nakagawa et al. | 364/410 |
| 4,926,372 | 5/1990 | Nakagawa | 364/900 |
| 4,949,298 | 8/1990 | Nakanishi et al. | 364/900 |
| 4,984,193 | 1/1991 | Nakagawa | 364/900 |
| 5,004,232 | 4/1991 | Wong et al. | 273/435 |
| 5,070,479 | 12/1991 | Nakagawa | 395/575 |
| 5,112,051 | 5/1992 | Darling | 273/148 B |
| 5,134,391 | 7/1992 | Okada | 340/799 |
| 5,140,110 | 8/1992 | Nakagawa et al. | 174/250 |
| 5,226,136 | 7/1993 | Nakagawa | 395/425 |

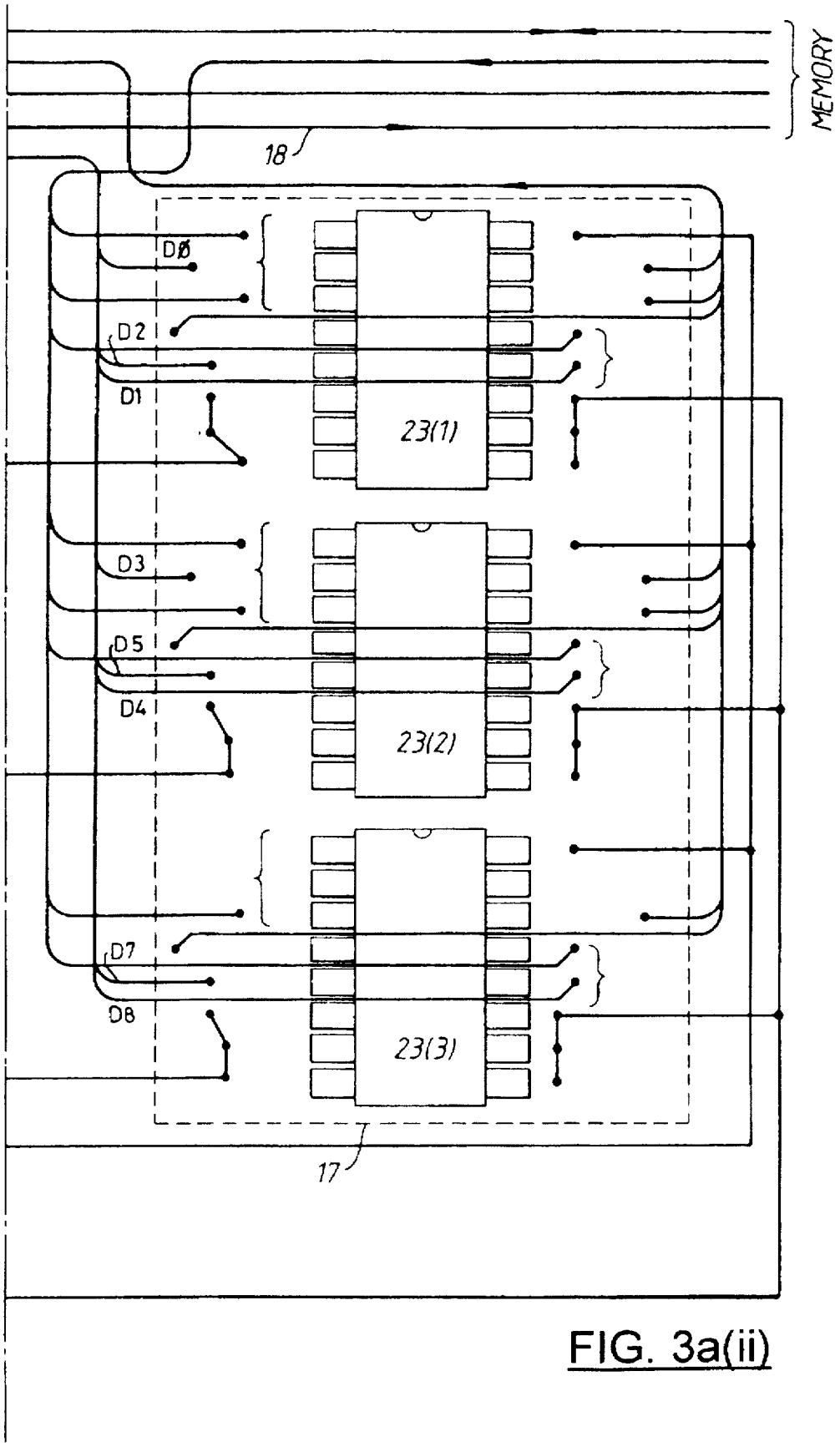
FIG. 3a(ii)

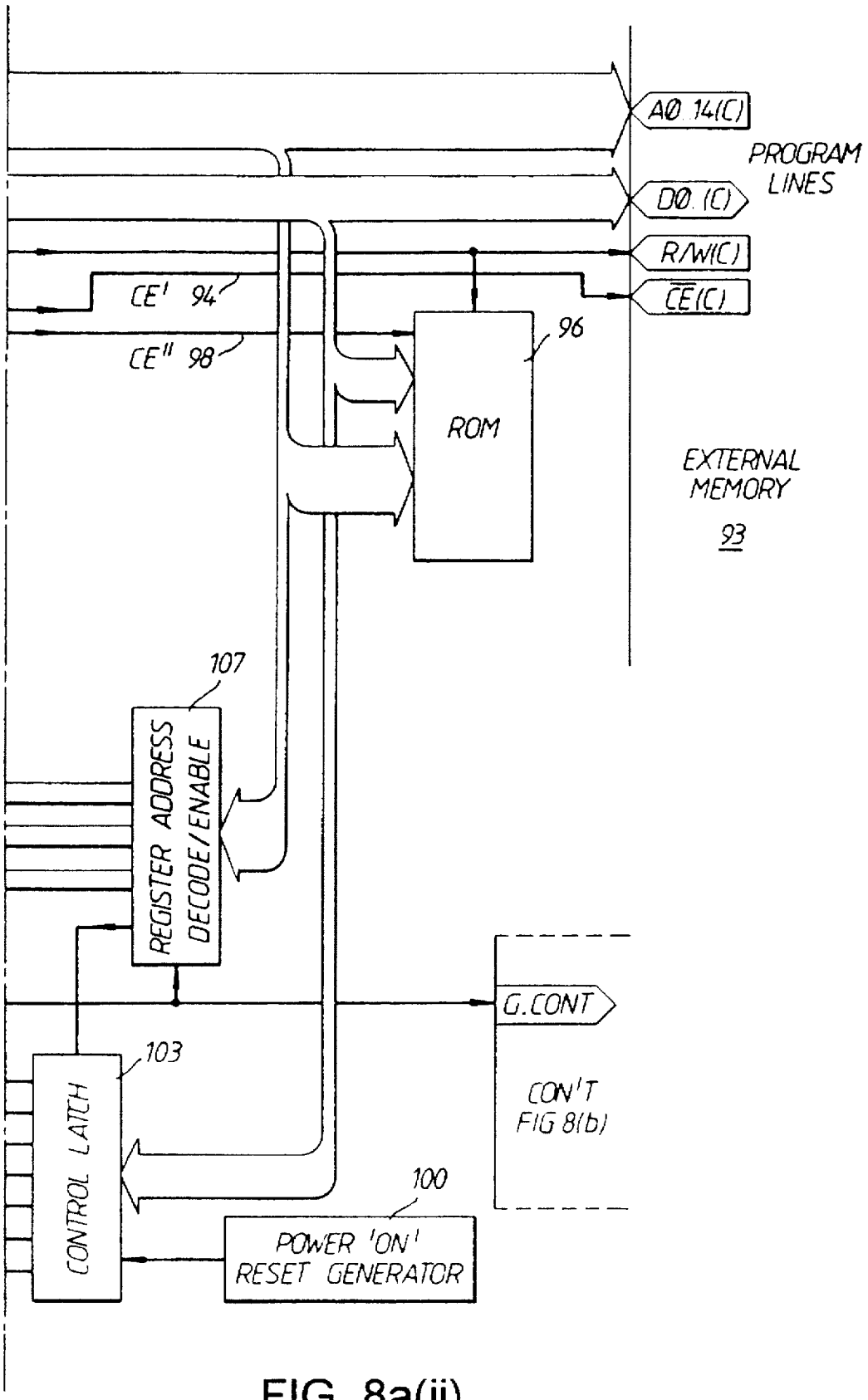
FIG. 8a(ii)

INTERFACING DEVICE FOR A COMPUTER GAMES SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to computer games systems and it relates particularly to an interfacing device for modifying the manner in which a computer game is played.

2. Description of the Prior Art

A conventional computer games system typically includes a computer containing the main processing unit, a visual display unit (VDU) on which a game is displayed and which may constitute a part of the computer, some form of interactive unit (e.g. a keyboard or joystick) enabling a player or players to react to and influence events during the course of a game, and an external data storage medium (e.g. a game cartridge) that can be plugged into or otherwise connected to the main processing unit and that contains data defining the characteristics (e.g. the rules) or the particular game being played.

In general terms, the main processing unit is programmed to address different storage locations in the external data storage medium, whereby to access the stored data as it is needed.

To that end, the main processing unit generates an address identifying a respective storage location in the storage medium, and this address is routed to the storage medium on an address bus. When the stored data is required, the processing unit sends a request signal to the storage medium, whereupon the data in the addressed storage location is accessed and then routed to the processing unit on a data bus.

The data stored in an external data storage medium determines the characteristics of the game stored therein and typically defines such game parameters as the number of playing units (e.g. cars, planes, etc.), the number of lives ascribed to individual players, the duration of particular events, time limits and speed settings, color and so on.

Generally, computer games require the players to complete various tasks (e.g. to complete a fixed number of laps of a track), and failure to complete a task satisfactorily results in some cases in the elimination of a player from the game. In many games, the players may be ascribed more than one "life," and this can affect the difficulty, or ease, with which the game is played.

With existing systems, the characteristics of a game, and in particular its degree of difficulty, are to a large extent predetermined by the data stored in the external data storage medium. Consequently, existing computer games tend to lose their appeal and present less of a challenge to the player the more times they are played—that is to say the games have limited "playability."

OBJECTS AND SUMMARY OF THE INVENTION

It is an object or the present invention to alleviate the aforementioned shortcomings of existing computer games systems that use an external data storage medium such as a cartridge with a read-only memory (ROM) and the like.

Another object of the invention is to provide an interfacing device for connecting a processing unit of a computer games system to an external dais storage medium, the interfacing device being capable of operating in various ways, either user-selected or preset, for modifying the rules of the game, thereby enhancing the playability of the game.

The foregoing and other objects of the invention are attained by the provision of an interfacing device for connecting a processing unit of a computer games system to an external data storage medium so as to enable the processing unit to address, and receive data from, different storage locations in the external data storage medium, the interfacing device comprising means responsive to the processing unit for recognition of a selected address and means for modification of data processed by the processing unit in response to such recognition.

With an interfacing device constructed in accordance with the invention, the user has the capability to substitute his own, user-generated data for that which would otherwise be supplied to the processor by the external data storage medium, and in this way the user can control and radically change the parameters or the game normally defined by the data stored in the external data storage medium and thereby enhance the "playability" of the game In a particular embodiment of the invention, the modification means comprises user-operable means for generating a first signal and a second signal representing the selected address and user-selected data respectively, means for comparing the selected address represented by the first signal with an address from the processor, and means for supplying the user-selected data to the processor, in substitution for the data in the addressed storage location of the external data storage medium if the compared addresses are the same.

The supplying means may be a semiconductor switching device responsive to an output from the comparing means.

In accordance with another aspect of the invention, there is provided a computer games system comprising a main processing unit, an external data storage medium and an interfacing device, in accordance with the first aspect of the invention, for interconnecting the main processing unit and the external data storage medium.

According to a yet further aspect of the invention there is provided a method of playing a computer game using a computer games system having a processing unit and an external data storage medium, including the steps of comparing an address from the processing unit with a selected address and modifying data supplied to the processing unit whenever the compared addresses are the same.

In accordance with another aspect of the invention, the modifying of the data takes place only if the data from the external data storage medium matches data set by user-operable input means (which may be switches, keypad, joystick, etc.). In other words, the data is modified only if it is what the interface expects to find there. Some large programs have "bank switching," which means that several banks of data are stored at each address. This "data compare" feature of the invention ensures that only data at the correct address and the correct bank is modified.

BRIEF DESCRIPTION OF THE DRAWING

Interfacing devices embodying the present invention are now described, by way of example only, with reference to the accompanying drawings, in which:

FIG. 8c is a more detailed block diagram of a portion of the circuitry of FIG. 8a;

DESCRIPTION OF THE PREFERRED EMBODIMENTS

Figure 1A:
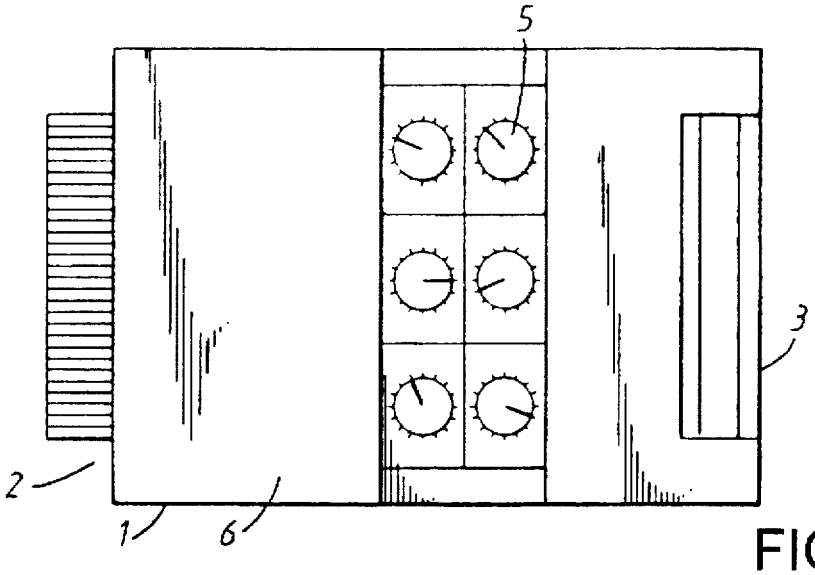
FIGS. 1a, and 1b and 1c are respectively top plan, side and perspective views of an interfacing device in accordance with the invention.
Figure 1B:
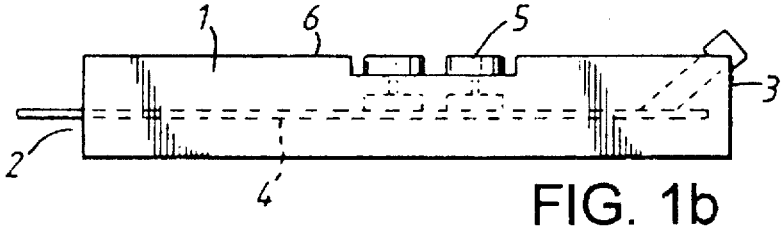
Figure 1C:
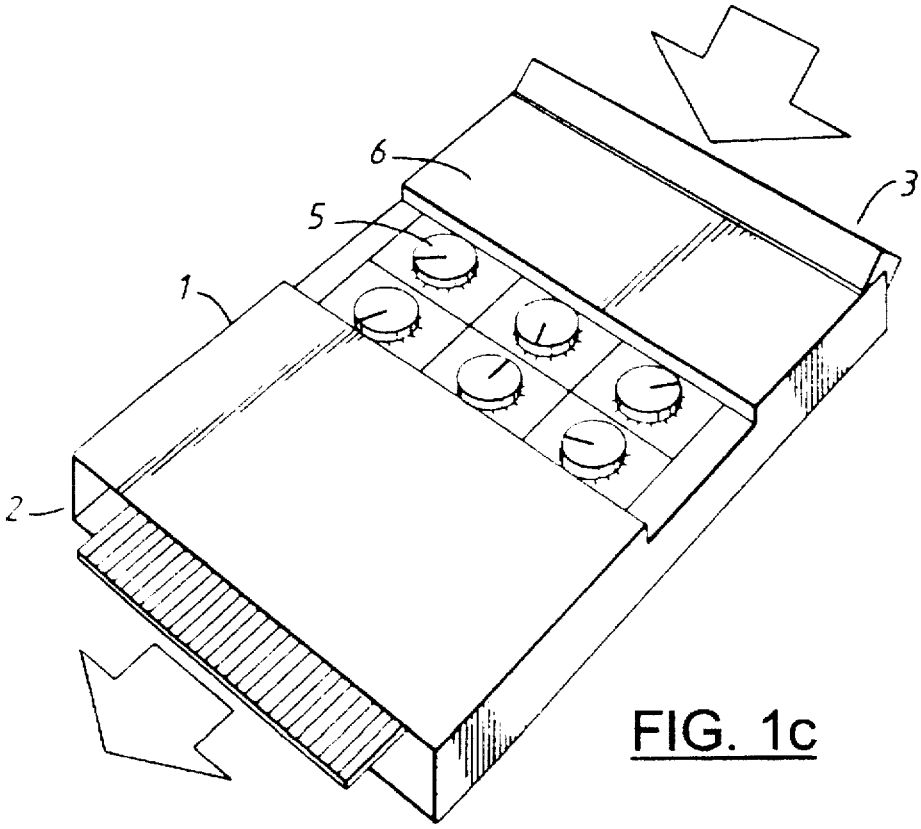

The interfacing device shown generally in FIGS. 1a, 1b and 1c comprises a shallow case 1 of which one end 2 is intended to fit into a receiving port of a computer games console such as the well-known Nintendo console and the opposite end 3 is intended to receive an external data storage medium (hereinafter referred to as a memory), such as a cartridge having a read-only memory (ROM).

The case contains a printed circuit board 4 that carries interfacing circuitry, the board 4 being provided at each end thereof with suitable end connectors enabling the interfacing circuit to detachably interconnect the main processing unit of the games console and the external memory.

As will become clear hereinafter, in this embodiment of the invention user-adjustable switches 5 set into the upper wall 6 of case 1 may be utilized to modify the manner in which a game stored in the memory is played. In the illustrated example, six 16- position rotary switches are provided.

Figure 2:
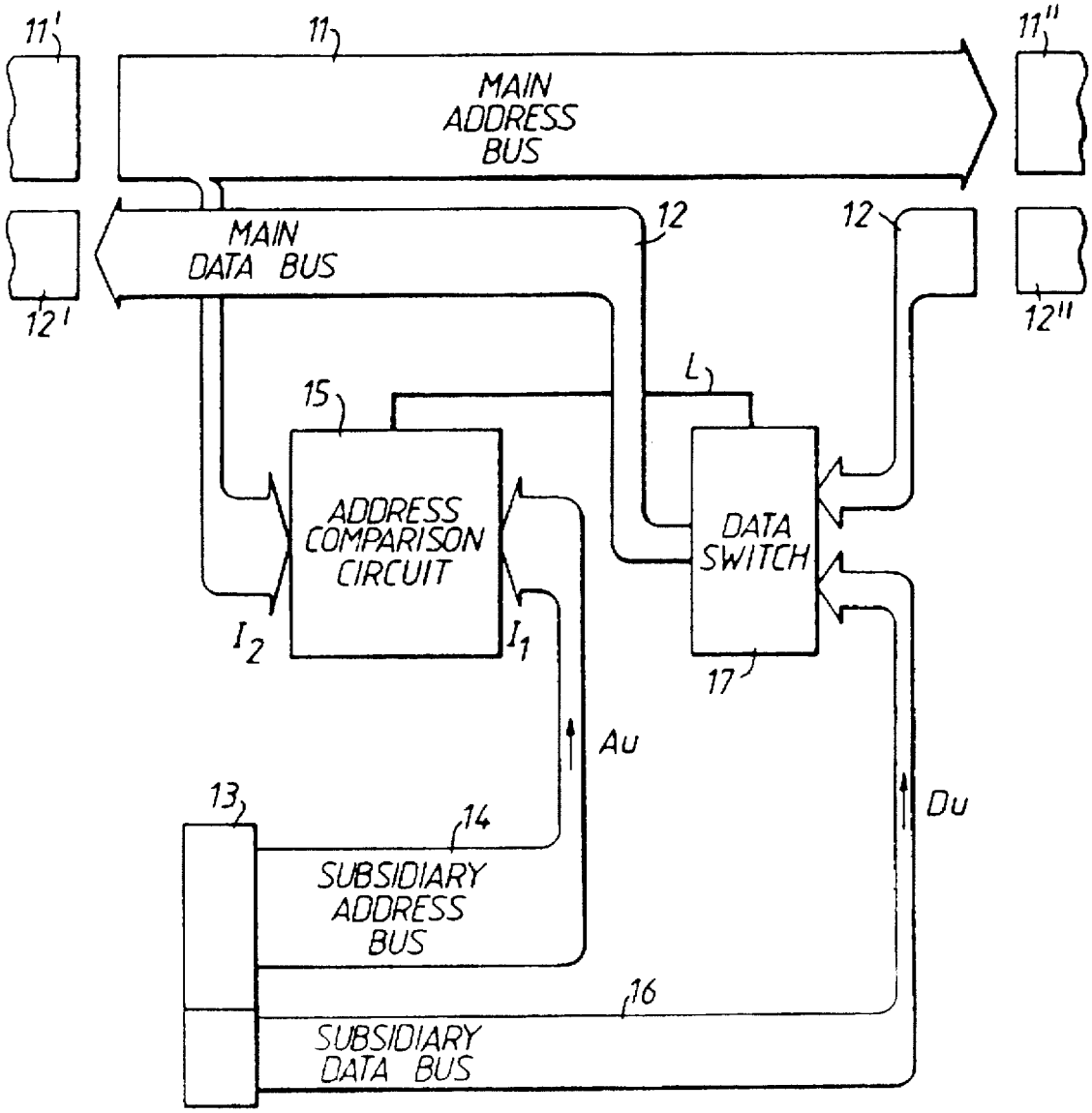
FIG. 2 is a block diagram of circuitry used in the interfacing device of FIGS. 1a, 1b and 1c.

As FIG. 2 shows, the interfacing circuitry comprises a main address but 11 for interconnecting the address bus 11' of the main processing unit and the address bus 11" of the external memory, whereby addresses can pass from the main processing unit to the memory.

Similarly, the interfacing circuit has a main data bus 12 that interconnects the data bus 12' of the main processing unit and the data bus 12" of the external memory, whereby data can pass from the external memory to the main processing unit in response to received addresses, provided such data has not been blocked by circuitry (to be described) in the interfacing device.

The interfacing device has a user-operable selection unit 13 by which the user can generate a user-selectable address ($A_u$) and user-selectable data ($D_u$). The user-selectable address ($A_u$) is routed on a subsidiary address bus 14 to one input $I_1$ of an address comparison circuit 15, and the user-selectable data ($D_u$) is routed on a subsidiary data bus 16 to an input of a data switching device 17. As FIG. 2 shows, addresses on the main address bus 11 (which are, of course, generated in the main processing unit) are routed to a second input $I_2$ of the address comparison circuit 15 for comparison with the user-selectable address ($A_u$) at the first input $I_1$.

If the compared addresses are different, data from the external memory is routed, via the switching device 17, onto the main data bus 12 for onward transmission to the main processing unit.

If, however, the compared addresses are the same, the address comparison circuit 15 generates an actuation signal on line L causing the data switching device 17 to change its switching condition, blocking the transmission of data from the external memory and routing the user-selected data $D_u$onto the main data bus 12 for onward transmission to the main processing unit.

By this means, the user-selected data generated by selection unit 13 is substituted for data from the respective storage location of the memory upon recognition of an address selected by the user.

This substitution may be illustrated by the following simple example.

It will be assumed that the user has set the user-selectable address $A_u$at a value 1002 (which location contains "7") and the user-selectable data $D_u$ at a value "3". In tact, as will be described hereinafter, the selected address and data are normally encoded n accordance with a hexadecimal coding format, though of course this is not a requirement.

If the current address from the processing unit is 1001, say, it is not recognized by the address comparison circuit 15 and so the data held on the addressed storage location of the external memory (i.e. that corresponding to address 1001) is routed to the main processing unit on the main data bus 12. The stored data supplied to the processing unit in this way might have the value "9", say, different from the value of the user-selected data.

If, on the other hand, the current address from the processing unit is the same as that selected by the user, then the user-selected data, having the value "3", is supplied to the processing unit in substitution for the data stored in the addressed storage location of the external memory.

The alternative data values ("3" and "7") may represent the number of lives ascribed to a player and so, by changing the value from "7" (the value stored in the external memory) to a different value ("3" in this example), the user has the capability to modify (increase in this example) the difficulty of the game to a desired extent.

Figure 3A:
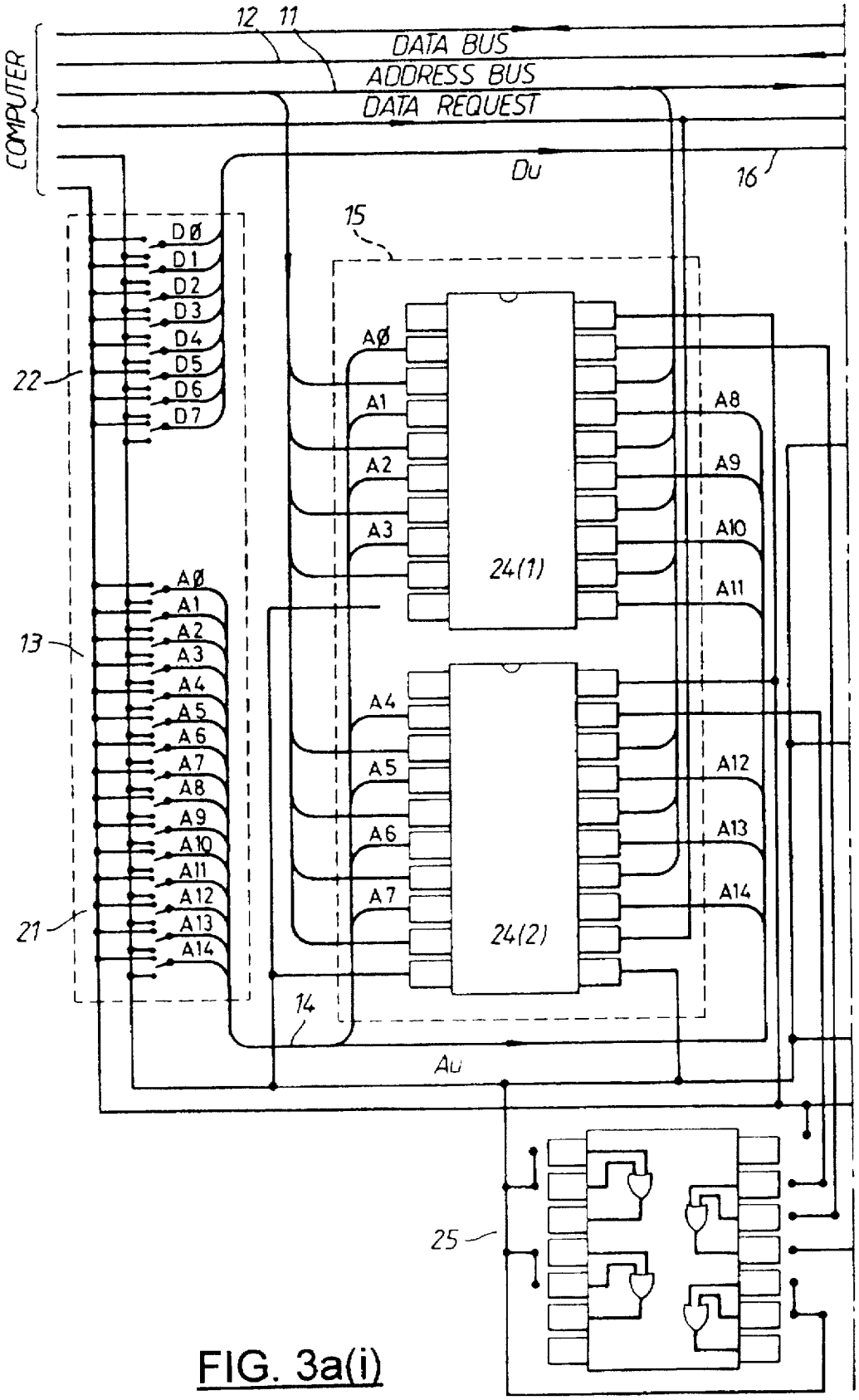
FIG. 3 shows the circuitry of FIG. 2 in more detail.

FIG. 3 shows the interfacing circuit in somewhat more detail. The main address and data buses, which interconnect the main processing unit and the external memory, are again referenced at 11 and 12 respectively, and a data request bus is shown at 18.

The user-controllable selection unit 13 comprises two banks 21, 22 of user-selectable switches, one 21 of the banks comprising switches Aϕ.....A14 for setting the user-selectable address $A_u$ and the other 22 of the banks comprising switches Dϕ.....D7 for setting the user-selectable data $D_u$.

The switching arrangement shown in appropriate to generate binary address and data signals encoded in accordance with the hexadecimal coding formal and can in practice be embodied as respectively four and two 16-position rotary, or alternatively configured, switches. Alternatively, a preset plug-in pin connection package can be substituted for the arrangement of switches.

The user-selectable address and data signals can alternatively be held in latches. In this case many types of data entry system (e.g. keypad, voice input) can be used to set the latches.

The data switching device 17 comprises three identical integrated-circuit data switches 23(1), 23(2), 23(3) (Ref. No. 74HC4053P) which are connected, as shown, to the external memory and to the bank of switches 22 by the main and subsidiary data buses 12 and 16, respectively.

The address comparison circuit 15 comprises two identical integrated circuits 24(1), 24(2) (Ref. No: 74LS684N) that are connected, as shown, to the main processing unit and the bank of switches 21 by the main and subsidiary address buses 11, 14 respectively, and an integrated OR gate 25 (Ref. No.: 74LS32) is provided to effect an change in the switching condition of the device 17 in response to recognition by the address comparison circuit 15 of an address selected by the user.

While the described embodiment enables recognition of a single address and substitution of data corresponding thereto, the invention also embraces recognition of two or more different addresses and substitution of the respective data corresponding thereto.

Figure 4A:
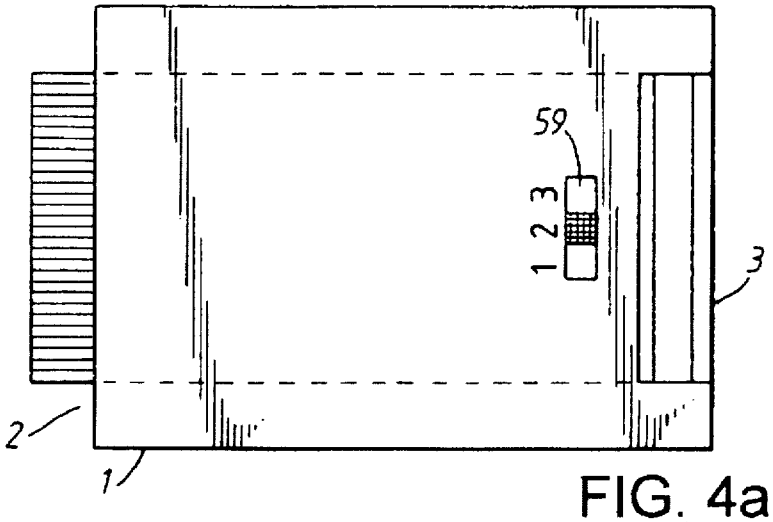
FIG. 4a, 4b and 4c are respectively top plan, side and perspective views of another interfacing device in accordance with the invention.
Figure 4B:
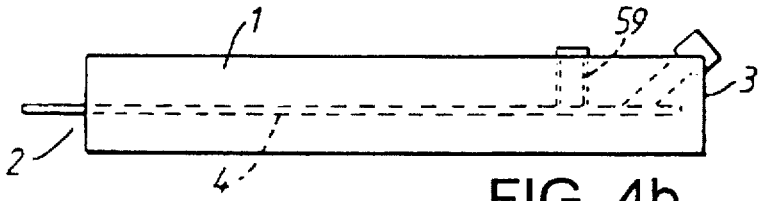
Figure 4C:
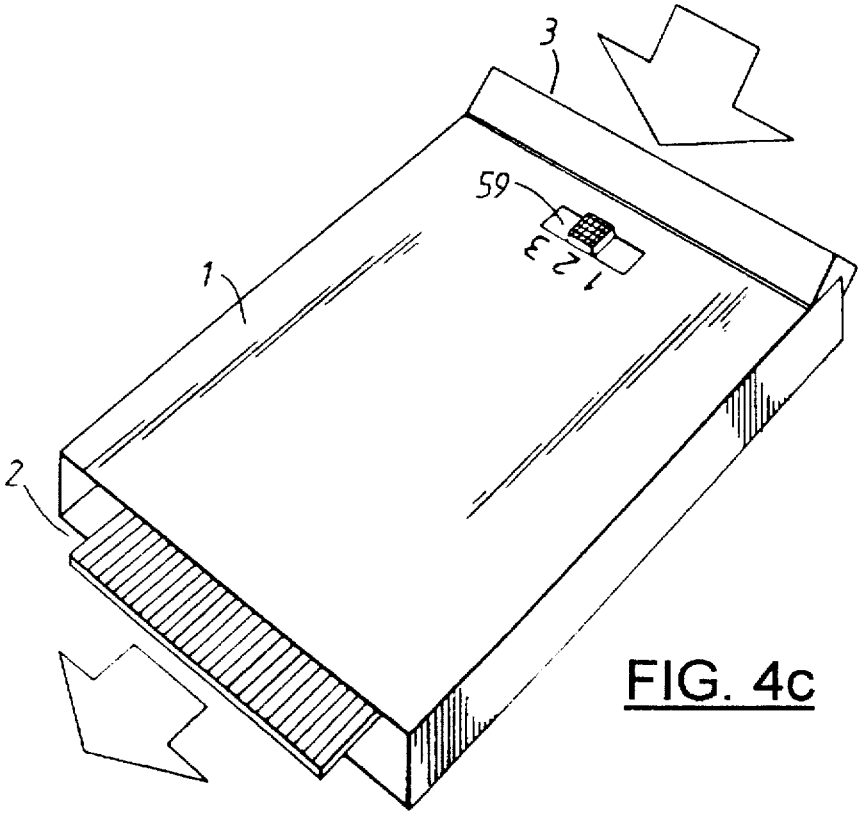
Figure 5:
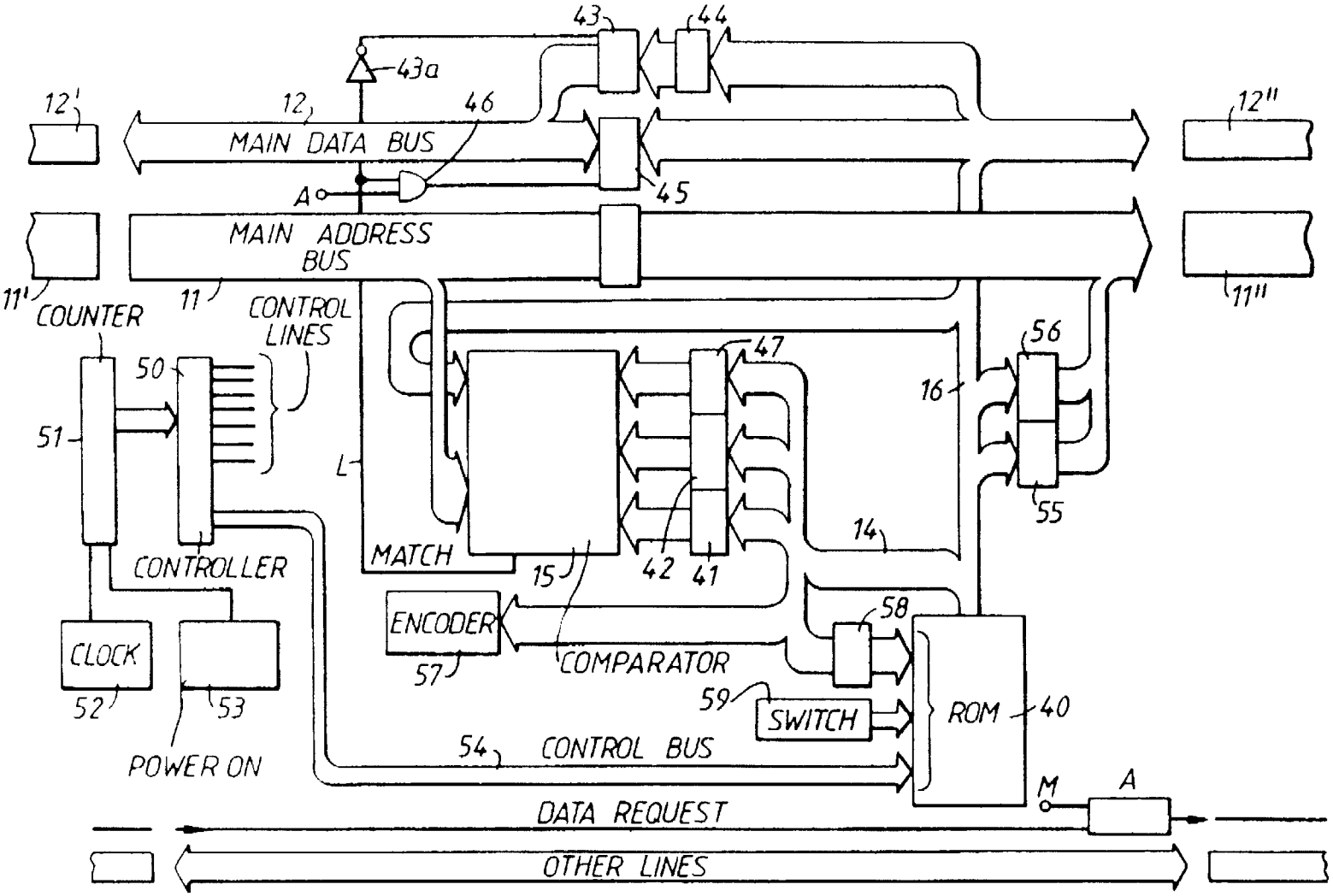
FIG. 5 is a block diagram of circuitry used in the interfacing device of FIG. 4.

In another embodiment of the invention, shown in FIGS. 4 and 5, the interfacing device utilizes preselected addresses and preselected data.

The embodiment shown in FIGS. 4 and 5 is similar to that shown in FIGS. 1 to 3, and common components are given like reference numerals.

However, in this embodiment, the user operable switch (shown at 13 FIGS. 2 and 3) is replaced by an internal memory in the form of a read-only memory (ROM) 40.

The subsidiary address bus 14 connects the address output of the ROM 40 to a 24-bit address comparison circuit 15 via two address latches 41 and 42 that are connected in parallel, and the subsidiary data bus 16 connects the data output from the ROM 40 to the input of an 8-bit buffer 43 via a further latch 44. The output of the buffer 43 is connected to the main data bus 12, which, as shown, also incorporates an 8-bit buffer 45.

Both buffers 43 and 45 are controlled by an address comparison signal L generated by the address comparison circuit 15, whereby data is selectively routed to the processing unit either on the main data bus 12 or on the subsidiary data bus 16, depending on the result of a comparison carried out in the address comparison circuit.

Latches 41 and 42 are set to hold the high and low bytes respectively of a preselected, two-byte (16-bit) address $A_p$ transmitted thereto from the ROM 40 over the subsidiary address bus 14.

Similarly, the latch 44 is set to hold pre-selected data $D_p$ (corresponding to the preselected address $A_p$ in the latches 41 and 42) transmitted thereto from the ROM 40 over the subsidiary data bus 16.

The preselected address $A_p$ held in the latches 41 and 42 is compared with the current addresses transmitted from the processing unit over the main address bus 11.

If the compared addresses are different, the address comparison signal L goes high, thereby maintaining the buffer 43 (which is supplied via an inventor 43a) closed and the buffer 45 (which is supplied via a logical AND gate 46) open and allowing data to pass directly from the external memory to the processing unit over the main data bus 12.

However, if the compared addresses are the same, the address comparison signal L goes low, thereby maintaining the buffer 43 open and the buffer 45 closed and enabling the preselected data $D_p$ held in the latch 44 to pass to the processing unit in substitution for the data in the external memory.

In this embodiment, the interfacing device has the capability to modify data received from any one of a range of different external data storage media (containing different computer games) that can be plugged into the device.

To that end, the ROM 40 (*a data source*) stores a plurality of different pre-selected addresses together with a corresponding plurality of different preselected data, and each preselected address is utilized in conjunction with the corresponding preselected data to modify the data from a respective external memory.

Clearly, in order to access the correct preselected address (and data) to the latches, to enable address comparison and (possible) data substitution to take place, the interfacing device must be capable of identifying which external memory has been plugged into its receiving port.

To that end, additional control circuitry is provided that, in effect, enables the interfacing device to interrogate two data bytes of the external memory.

These data bytes carry sufficient information to unambiguously identify the external memory and thereby enable the correct preselected address and the corresponding preselected data to be accessed to latches 41, 42 and 44 to facilitate the desired data substitution, as described hereinbefore.

The identification procedure is controlled by means of a controller 50 that is clocked by a counter 51 operating in conjunction with a clock circuit 52 and a "power-on" timing circuit 53.

When the external memory is first plugged into the interfacing device and power is supplied to the processing unit, the counter 51 is initialized and the external memory is isolated from the processing unit (by setting input A of the AND gate 46 low).

The controller 50 then transmits successive control signals to the ROM 40 on a control bus 54, causing the high and low bytes of the first address stored in the ROM 40 (corresponding to the first data byte for identification in the external memory) to be routed to the latches 55 and 56 respectively. In this way, the latches 55 and 56, which are connected to the external memory via the main address bus 12, are set to hold the first address (corresponding to the first data byte in the external memory). In response to this address, the first data byte is transferred from the external memory to an encoder 57 (the main data bus 12 being blocked by the buffer 46), where it is latched. This procedure is repeated for the second data byte for identification in the external memory, which is also transferred to, and latched in, the encoder 57.

The encoder 57 then performs preset, logical operations on the first and second latched data bytes and generates an output that uniquely identifies the external memory. This output is held in a ROM latch 58 (which had previously held a zero data field), and the encoder 57 is then disabled. The controller 50 selects from the ROM 40 the pre-selected address (and the preselected data) appropriate for the external memory represented by the output held in the ROM latch 58 and causes the high and low bytes of this preselected address to be transferred to the latches 41 and 42 respectively and the required preselected data to be transferred to the latch 44.

As described hereinbefore, the address comparison circuit 15 compares the latched, preselected address with the current addresses from the processing unit. However, the address comparison circuit 15 also compares current data transmitted from the external memory over the main data bus with data held in a fourth latch 47. The latched data (which is also derived from the ROM 40) is chosen to be the same as the data (from the external memory) which is to be replaced by the preselected data held in the latch 44. This additional comparison ensures substitution of the correct data and prevents errors which could arise as a result of an ambiguity in the process of comparing addresses.

The ROM 40 may have a number of different data banks, and so the data and address associated with each external memory may have a number of alternative values. In these circumstances, a user-operable switch 59 may be provided, enabling the user to select a desired data bank from the ROM 40 and thereby select a desired effect, e.g. a desired degree of difficulty (hard, medium or easy, say) with which the game is to be played.

In the described embodiment, each preselected address is allocated to a respective external memory. Alternatively, however, more than one of the preselected addresses can be allocated to the same external memory, thereby enabling more than one aspect of a game to be changed.

Figure 6:
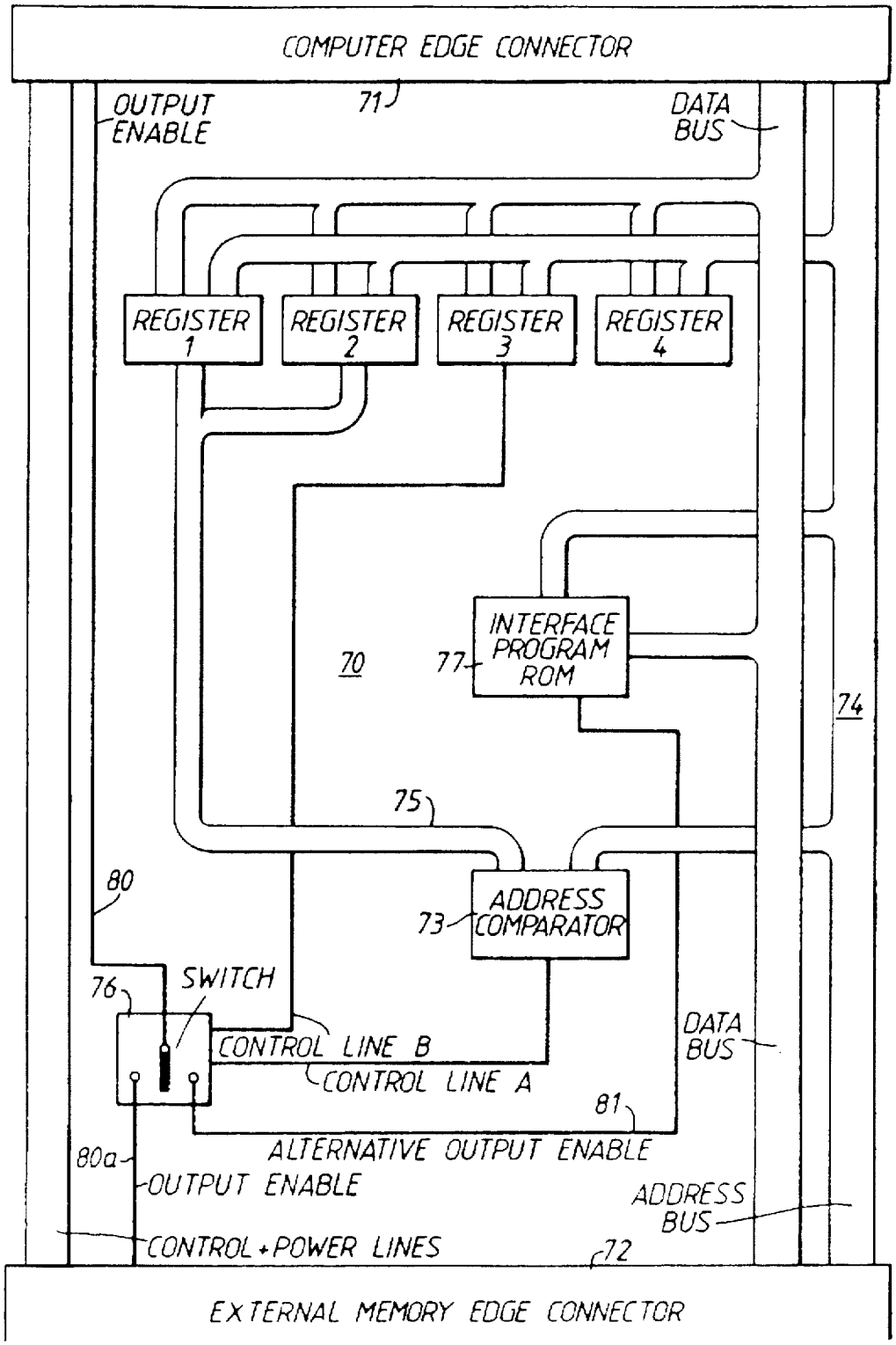
FIG. 6 is a block diagram of an alternative embodiment of the invention.

In another embodiment of the invention, illustrated in FIG. 6, an interfacing device for a computer games machine connects to the external program cartridge and the computer games machine allows the program cartridge to function normally except for one or more modifications performed by the interface.

These modifications affect one or more aspects of the game and can be either user selectable or preset in the interface.

In this respect, the embodiment of FIG. 6 is the same as the other embodiments.

However, in the embodiment of FIG. 6, the interface allows the program to execute normally but interrupts the processor at a particular point or points (user-selected or preset) in the program. When this interrupt occurs, the game is temporarily suspended while the interface banks its own ROM into the processor's memory and executes a piece of code. This code is such that a modification is effected on the games computer's internal memory. This interface then banks its own ROM out and allows the computer to continue executing the game as if nothing had happened.

This process allows a user or a preset ROM to change many of the variables that control aspects of a game, modifying the game in countless different ways.

The effect of this is very similar to the effect of the previous embodiments. The manner of operation is, however, different. Instead of changing the way the computer interprets or accesses external memory, this method changes the computer's internal memory itself in such a way that very similar results can be achieved: e.g., extra lives, skipped levels, increased or decreased car speed, etc.

Conventional devices that interrupt a program perform a designated function and then pass control back to original program. The purpose is normally to perform additional tasks rather than to change the way the existing program works. Also, the conventional devices are normally "stand-alone units" that do the same thing regardless of the program that is running. In contrast, the apparatus of the present invention produces its visible and audible effects in a manner that is intrinsically dependent on the "host" program. Moreover, it acts as an interface between the computer and the external memory in order to prevent access to the external memory when it wants to present its own program to the computer instead.

Conventional interrupt-controlled devices are activated entirely independently of the program that is running. In contrast, apparatus constructed in accordance with the present invention is activated upon detection of the exact address of a particular piece of program being accessed. It then makes changes to the computer's internal memory to affect the way the program works. This is not needed in conventional usage because it is easier for the original programmer to make the change before the external memory is produced.

In FIG. 6 the device 70 is an interface between a games computer (via edge connector 71) and a plug-in game cartridge external memory (via edge connector 72).

The address comparator circuit 73 compares the value on the address bus 74 with a preset value, in this case a value supplied on a bus 75 from registers 1 and 2.

When the compared values are different (i.e. normally), the computer accesses the external memory unhindered.

When the compared values are equal (i.e. the program is at the correct stage for the device to interrupt), an output signal is sent on control line A to a switch circuit 76, which in a practical embodiment may be a semiconductor device.

This has the effect of connecting the output enable line 80 from the computer through the switch 76 and alternative output enable line 81 to the device's internal ROM 77 instead of connecting the output enable line 80 to the external memory edge connector 72 through the extension 80a. At this point the computer starts addressing the ROM 77 instead of the external memory.

The ROM 77 can then make changes to the RAM and other registers housed in the computer (or in the interface 70) to effect changes in the way the program operates.

The switch 76 then reverses and re-enables the external memory by switching the output enable line 80 back to connect from the computer to the external memory through the extension 80a. In this example this is done by way of register 3, which controls control line B.

The program then continues where it left off but operating differently because of the changes that have been made.

When the external memory programs (games) are running on a computer, they constantly use the computer's internal RAM as a temporary scratch-pad for storing values that change. These values are typically used for parameters such as number of lives remaining, current level number, counters for timing loops (speed), number of cars, etc. In accordance with the present invention, the user—or the programmer of the ROM 77—can change these values in response to reaching a particular point in the program.

Figure 7A:
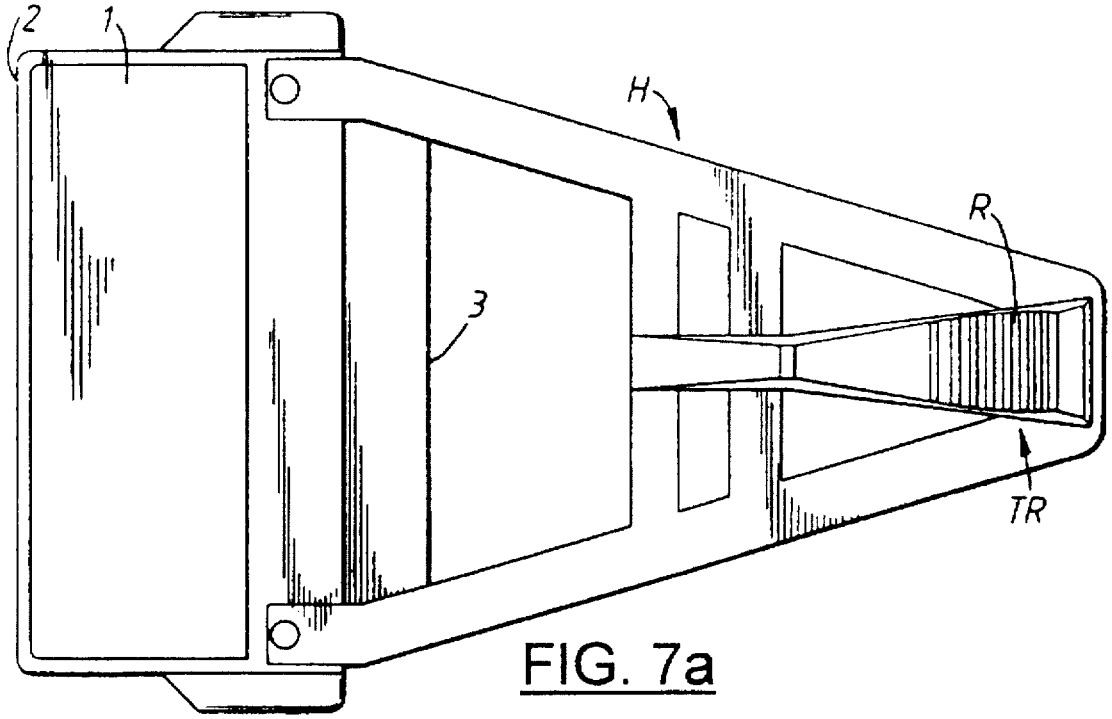
FIG. 7a, 7b and 7c are respectively top plan, side and perspective views of another embodiment of an interfacing device according to the invention.
Figure 7B:
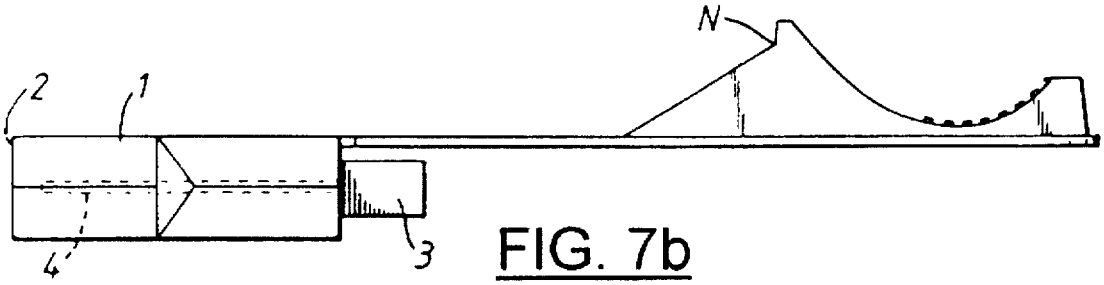
Figure 7C:
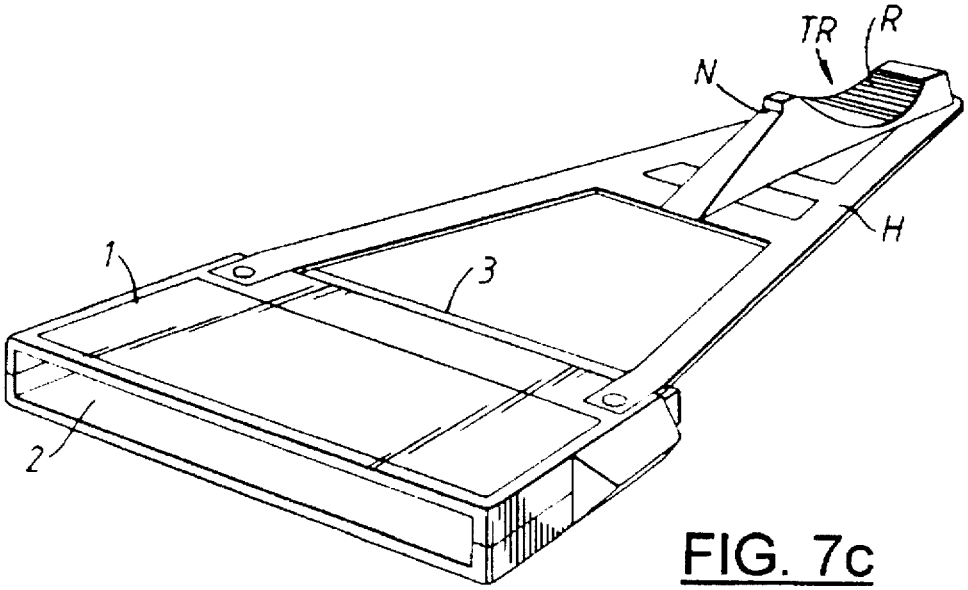

FIGS. 7a, 7b and 7c are respectively top plan, side and perspective vies of another embodiment of an interfacing device according to the invention. These figures show the best mode contemplated by the inventors for putting the invention into practice. The device comprises, as in the embodiments described above, a case 1 of which one end 2 is intended to fit within a receiving port of a computer games console and the opposite end 3 is intended to receive an external data storage medium or memory, such as a cartridge having a read-only memory or ROM.

The case contains, as in the embodiments described above, a printed circuit board 4 that carries interfacing circuitry, the board 4 being provided at each end thereof with suitable end connectors enabling the interfacing circuit to detachably interconnect the main processing unit of the games console and the external memory.

A handle portion H of generally triangular construction (as viewed from above) has an inclined portion I, a stop S, and a concave thumb rest TR provided with ridges R. The external data storage medium is connectable to the interfacing device in such a manner as to be positioned underneath the handle portion H. By virtue of the concave thumb rest TR formed on the upper surface of the handle portion H, an assembly of the interfacing device and the external data storage medium can conveniently be grasped with a thumb engaging the thumb rest TR and fingers engaging the external data storage medium for connection of the assembly to the processing unit of a computer games system. Moreover, the protruding thumb rest TR, and particularly the stop S thereof, prevents inadvertent insertion of the assembly of the interfacing device and game cartridge into the computer games machine in a n upside-down relation, since the stop S will in case of such an attempted erroneous insertion latch on the lower rim of the cartridge-receiving opening into the games machine.

Figure 7D:
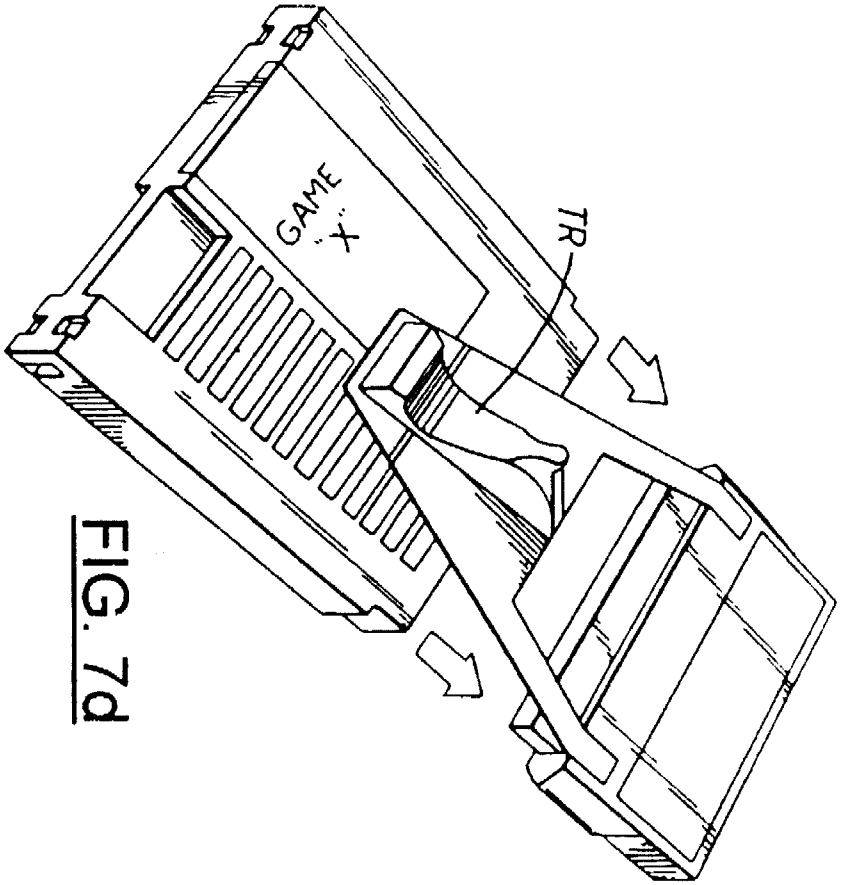
FIG. 7d is a perspective view showing an embodiment of the present invention just prior to its connection to a game cartridge.
Figure 7E:
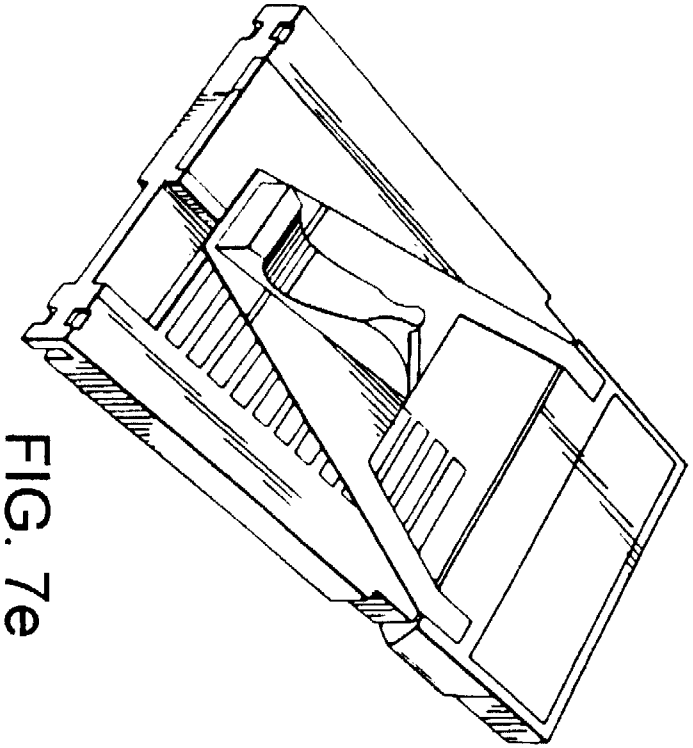
FIG. 7e is a perspective view showing apparatus in accordance with the invention after it has been connected with a game cartridge to form an assembly.
Figure 7F:
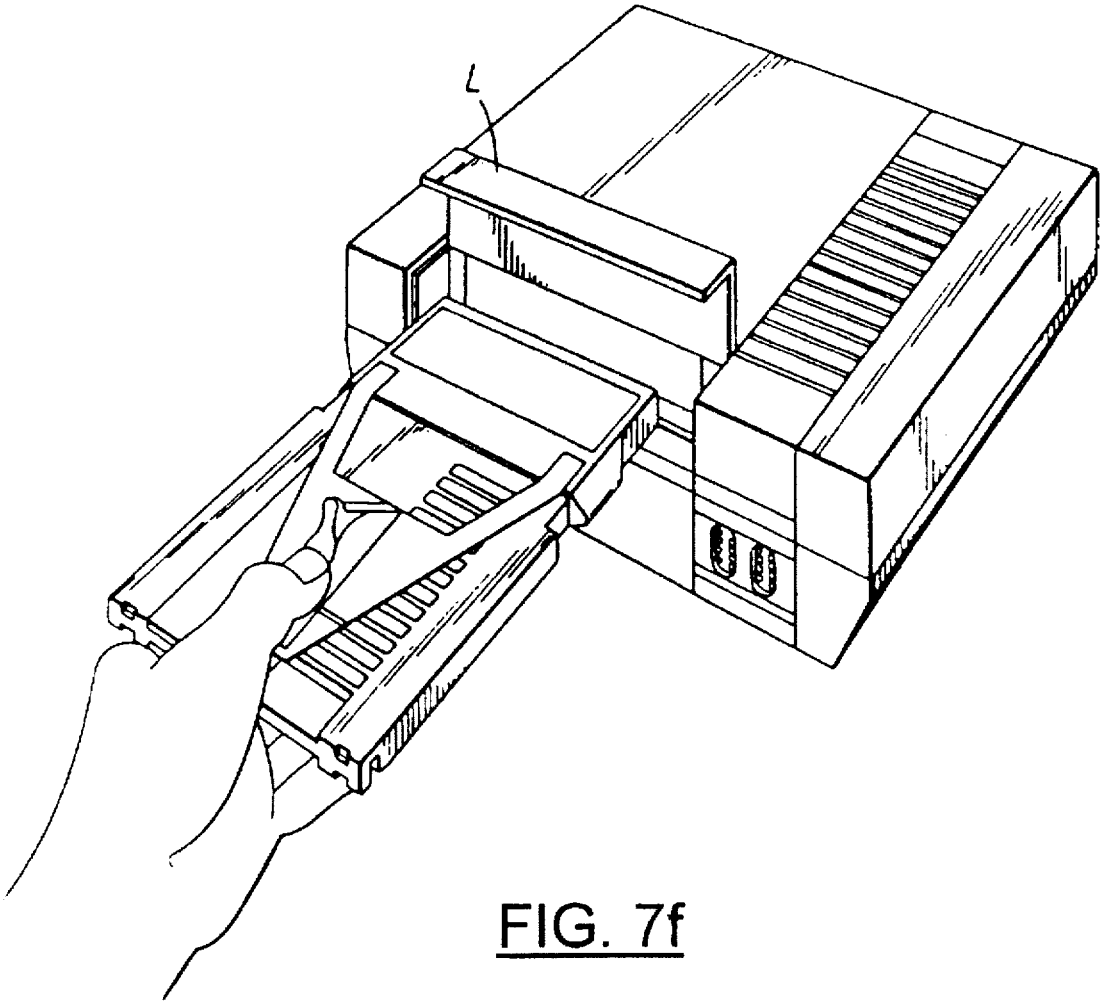
FIG. 7f is a perspective view showing the assembly of FIG. 7e just prior to insertion in a games machine.
Figure 7G:
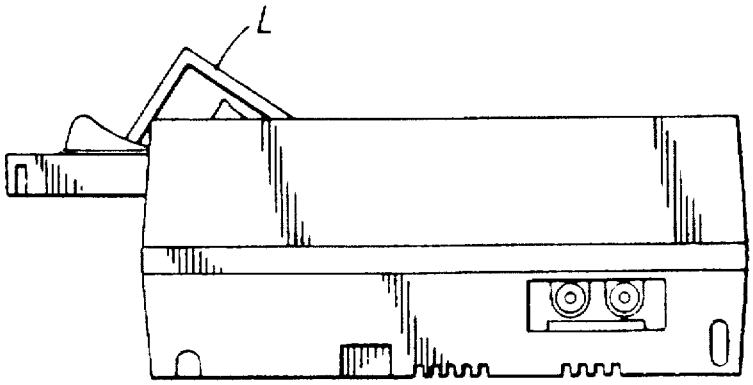
FIG. 7g is a side elevation showing the apparatus after the insertion of the assembly of FIG. 7e in a games machine.

FIG. 7d is a perspective view showing a "game X," which can be any conventional game cartridge, about to be assembled with the device according to the invention. FIG. 7e shows the game cartridge and the device according to the invention in assembled relation, and FIG. 7f shows the assembly about to be inserted into a games machine, for example a Nintendo machine. As noted above, the assembly is conveniently grasped with the thumb of the user in the thumb rest TR and the fingers of the user below the game cartridge. The assembly is inserted and appears then as in FIG. 7g, with the lid of the games machine resting on the thumb rest TR.

The printed circuit board 4 is thicker than normal, to allow the edge connector to make good contact with the games machine connector without the need for the interface to be pushed down fully in the normal way. That is, the printed circuit board 4 has sufficient thickness that the connection of the assembly or the interfacing device and game cartridge to the processing unit of the computer games machine can be effected with a movement that is rectilinear. This enables the unit to be made smaller overall and more elegant than it would otherwise be.

Figure 8A:
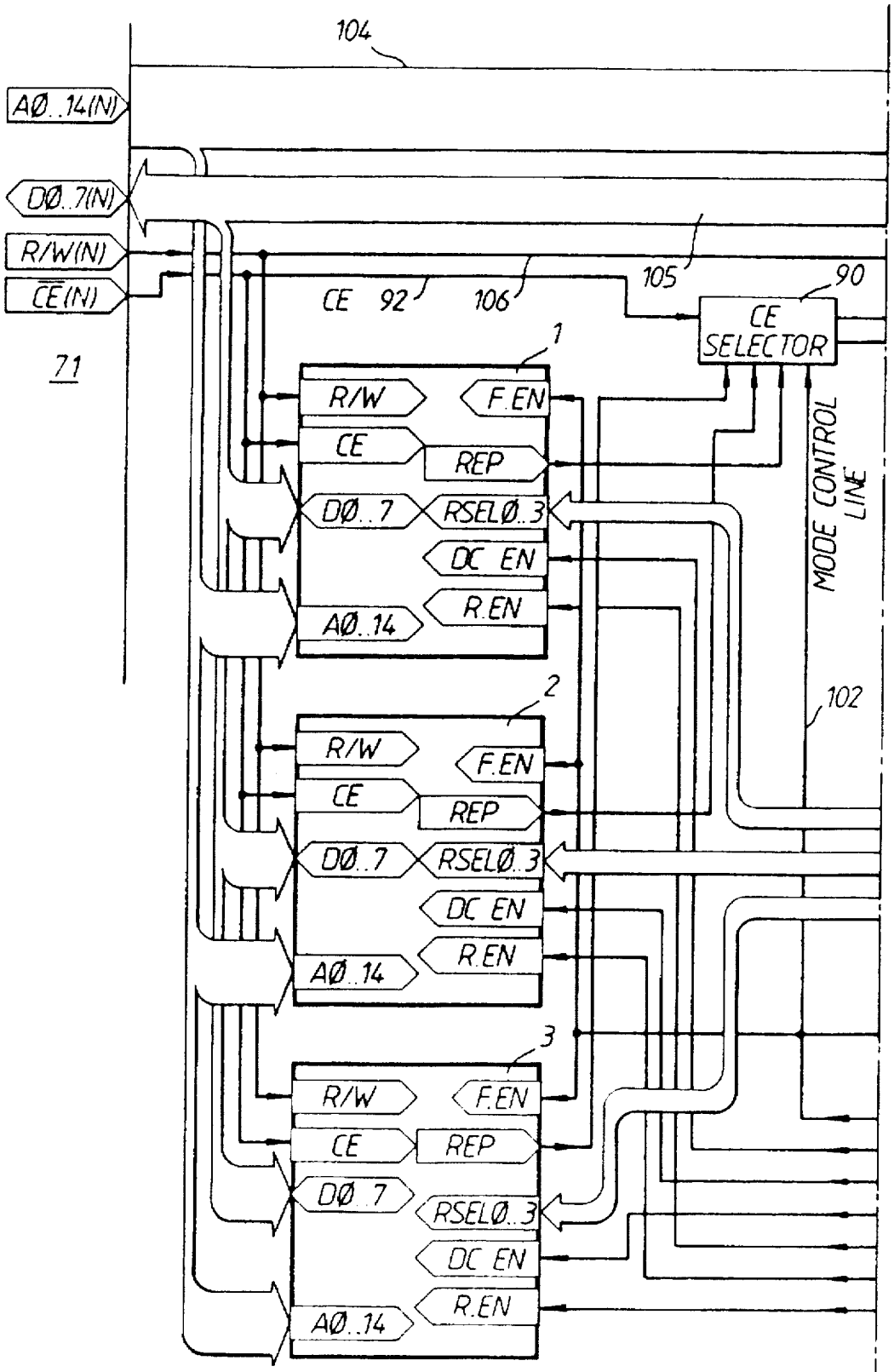
FIG. 8a and 8b collectively form a block diagram of circuitry used in the interfacing device of FIGS. 7a, 7b and 7c.
Figure 8B:
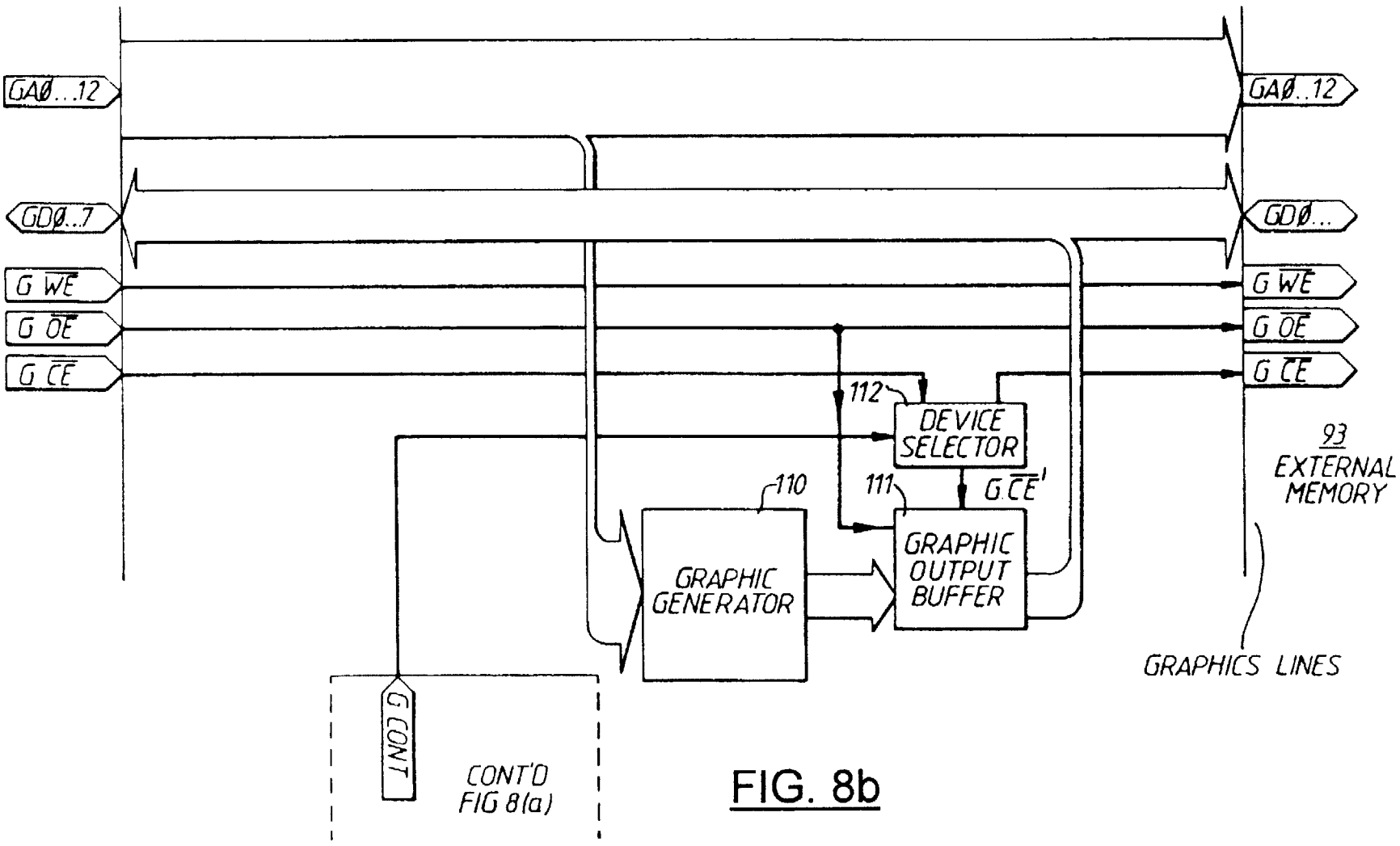
Figure 8C:
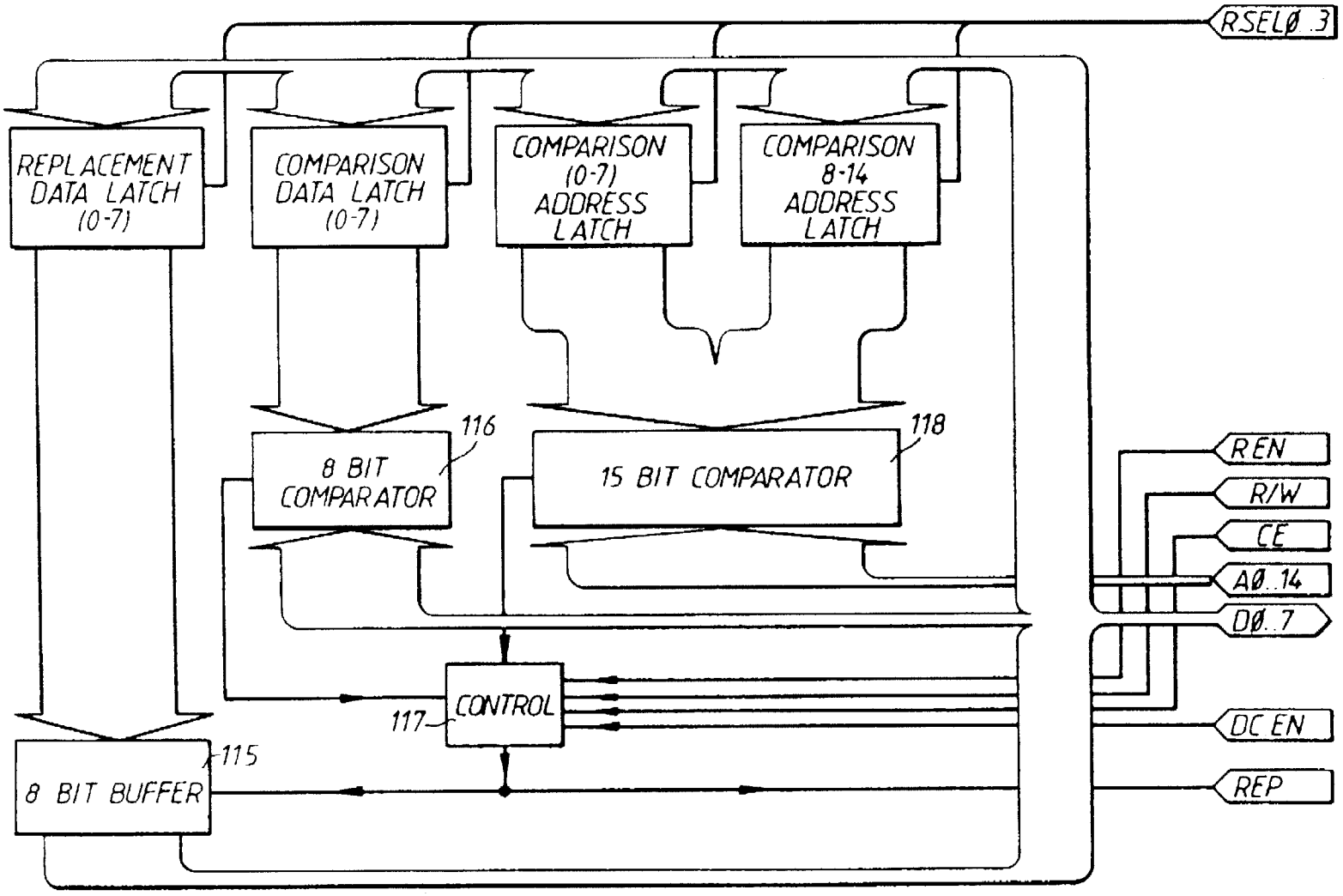

The circuitry incorporated in the device of FIGS. 7a–7g is illustrated in FIGS. 8a–8c. The circuitry shown in these figures has two modes or operation. Mode 1 is a latch-setting mode, wherein values for the address comparison, data comparison, and data replacement functions are set by the user. Mode 2 is an active mode, very similar to the operation of the embodiments described above, wherein the address comparators (as well as data comparators) send a signal to a data replacement unit to effect a replacement of the data when the conditions for data replacement are met.

The selection of mode 1 or mode 2 is made by an output signal from a control latch 103 on a mode select line 102. A CE line 92 that comes from the computer edge connector 71 (for example from a video games machine made by Nintendo) is connected to the CE selector 90, which is controlled by the signal on the line 102. In conventional structures, the line 92 would normally connect directly to the external memory, allowing it to respond to data read/write requests from the video games machine. In the circuit of FIG. 8a, the signal on the line 92 is passed either to the external memory 93 via a CE' line 94 or to an interface ROM 96 via a CE" line 98, depending on the state or the line 102. In this way, either the external memory 93 or the interface ROM 98 is made active. The circuitry also has a power-on circuit 100, which ensures that the line 102 from the control latch 103 is set to the latch setting mode when the power is first turned on.

MODE I: LATCH-SETTING MODE

The purpose of this mode is to allow the user to select the address comparison data and replacement data. The program in the ROM 96 is designed in such a way that it will accept input from the normal game control pad, operated by the user, and use it to move an on-screen pointer around the screen. Also on the screen there are 16 different letters (which represent values). The user can move the pointer to any of these letters and select them using a button oh the game control pad. By repeating this process the user can enter this data to represent addresses, comparison data bytes and replacement data bytes, as well as function enable/disable information. When the user presses the start button on the game controller, the software stores the data entered by the user in the latches in each of the comparison/replacement units 1, 2 and 3 as well as in a control latch 103.

It then sets a particular bit "0" in the control latch 103, which alters the state of the mode select line 102, thereby switching the device to its active mode by changing the state of the CE selector 90 to its other position. This has the effect of conditionally enabling the comparison/replacement units 1, 2 and 3.

MODE II: ACTIVE MODE

In this mode, the external memory has control of the CPU and the game will function normally, with the exception of any data replacement operations performed by the interface. The comparison/replacement units are now active, provided that the appropriate bit in the control latch has been set to enable them.

The structure illustrated in FIGS. 8a, 8b and 8c includes an address bus 104 connected to comparison/replacement units 1, 2 and 3 and a data bus 105 connected to the same units. At the left of FIG. 8a, the address and data buses connect to the games machine, and at the right to the game cartridge that is currently in use. In addition, a read/write line 106 is connected to the comparison/replacement units 1, 2 and 3, to the ROM 96 and to the video games machine and the particular game cartridge in use. The chip enable line 92 is connected to the chip enable or CE selector 90 as described before and also to the comparison/replacement units 1, 2 and 3.

The address and data buses 104, 105 are also connected to the ROM 96, and the address bus 104 is connected to a register address decoder 107. The latter produces three outputs which go respectively to inputs R.SELO...3 of each of the comparison/replacement units 1, 2 and 3. As FIG. 8c shows, the latter input goes to a replacement data latch 0-7, a comparison data latch 0–7, a comparison address latch 0–7, and a comparison address latch 8–14.

the data bus 105 also connects to the control latch 103, which produces the output on the line 102 to the CE selector, as noted above. The output on the line 102 also goes to the register address decoder 107 and to an output to FIG. 8b labeled G.CONT (graphics control).

The control latch 103 produces an output to an input labeled R.EN on each of the comparison/replacement units 1, 2, and 3 and an output to an input labeled DC.EN on each of the comparison/replacement units 1, 2 and 3.

Each of the comparison/replacement units 1, 2 and 3 produces an output on a terminal labeled REP ("replace") which is supplied to the CE selector 90.

In FIG. 8b, the graphics address 0–12 bus is connected to a graphics generator 110, which produces an output to a graphic output buffer 111. A device selector 112 receives inputs from the G.CONT terminal and from a G CE terminal and produces outputs to the graphic output buffer 111 and the G CE terminal of the game cartridge. The graphics lines GWE and GOE connect through FIG. 8b from the games machine to the game cartridge in use, and the latter line connects also to the graphic output buffer 111.

In FIG. 8c, the replacement data latch 0–7 connects to an 8 bit buffer 115. An 8-bit comparator 116 receives comparison inputs from the data line D0–7 and the comparison data latch 0–7 and produces an output signal to a control 117 when the inputs are equal. A fifteen bit comparator 118 receives at one input an output from the comparison address latch 0–7 and an output from the comparison address latch 8–14 and at the other input data from the address line 0–14. It produces a control output to the control 117 when the inputs are equal. The control 117 also receives signals from the R.EN, read/write, chip enable, DC.EN and F.EN terminals. Its output controls the 8-bit buffer 115 and is also supplied to the output terminal REP.

The Graphics Generator

Certain computer games devices, for example one made by Nintendo, normally generate a screen display by reading data from a graphics ROM. This data defines the bit patterns that make up the letters and graphical shapes that appear on the screen.

The screen is made up of many character- or letter-sized squares (or rectangles), called character cells, which are 8 by 8 pixels (picture elements, or dots) in size. Each pixel is defined by 2 bits in memory, representing one of four colors. Usually the graphics ROM is a minimum of 8K bytes in size, giving 512 different character cell definitions, as is needed for a normal game. This allows the system to produce colorful, detailed and varied graphics displays.

When in its latch setting mode, the device of FIGS. 8a–8d needs to use the screen for display purposes. Specifically, it needs to display the 16 letters for the user to choose from, the selected letters, and the product name at the top of the screen. It has been found it is not necessary to use the full capability of the normal graphic system, and that the complexity, size and cost of the device can be reduced by eliminating the graphics ROM chip normally required.

Figure 8D:
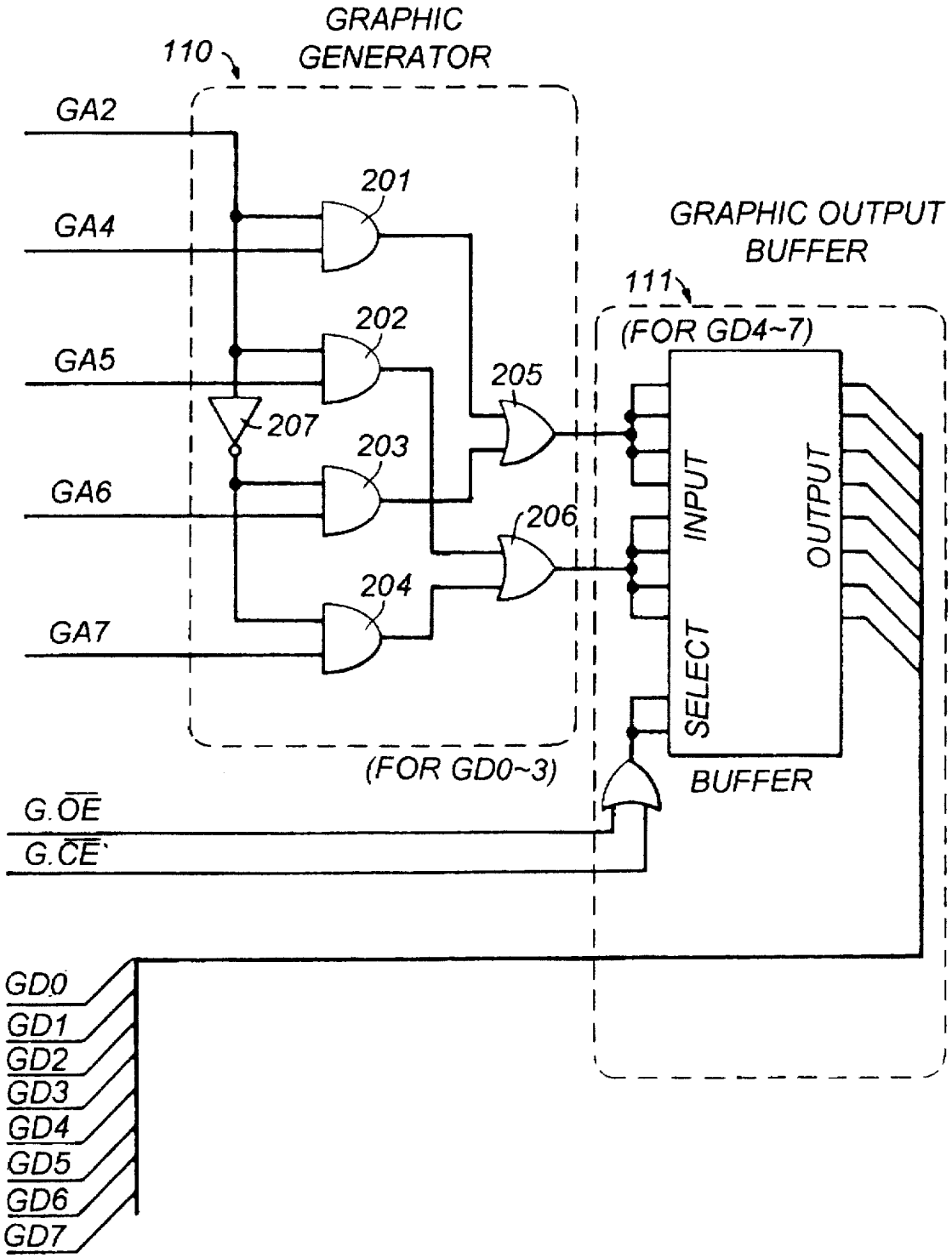
FIG. 8d is a more detailed block diagram of a portion of the circuitry of FIG. 8b.

In accordance with the invention as embodied in the circuitry of FIG. 8d, a simple circuit emulates a graphics ROM containing the 16 character cell definitions (FIG. 10b). Even though the graphics produced with this system are cruder (only each group of 4 by 4 pixels is selectable on or off, instead of each pixel being individual selectable) it is perfectly adequate for the purpose of displaying the 16 letters, selected letters and product name.

In FIG. 8d, a small circuit is added to the circuitry needed for the rest of the device. The circuit of FIG. 8d has a negligible cost and size, in contrast to the substantial cost and size of the separate ROM which would otherwise be required.

The graphics generator and the graphic output buffer of FIG. 8d together function as a graphics ROM emulator circuit.

A conventional computer games device such as one made by Nintendo is designed specifically to get its graphics data from external memory (ROM or RAM). The structure of FIG. 8d eliminates the need to have any external memory for graphics generation.

In FIG. 8d, the graphic generator 110 and graphic buffer output 111 are of course the same as the units shown schematically in FIG. 8b. FIG. 8d shows the inputs to the graphic generator 110 on lines GA 2, GA 4, GA 5, GA 6 and GA 7 and outputs on lines GD 0, GD 1, GD 2, GD 3, GD 4, GD 5, GD 6 and GD 7 plus a select input G.$\overline{OE}$ and C.$\overline{CE}$'.

The graphic generator 110 includes four AND gates 201, 202, 203, 204, two OR gates 205, 206 and an invertor 207. If the input GA 2 is high, the OR gate 205 is high only if the input GA 4 is high and the OR gate 206 is high only if the input GA 5 is high. On the other hand, if GA 2 is low, then the OR gate 205 is high only if Ga 6 is high and the OR gate 206 is high only if GA 7 is high.

Figure 8E:
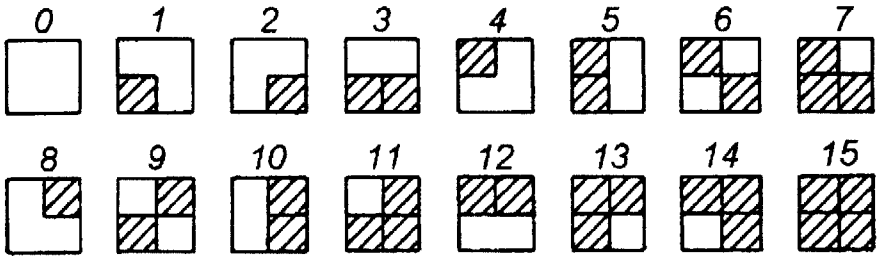
FIG. 8e is a schematic diagram showing 16 character cell definitions achievable in a cell measuring 8×8 pixels wherein only each group of 4×4 pixels is selectable on or off.

The object of the circuitry in FIG. 8d is to produce the 16 character bit patterns of FIG. 8e, these patterns being numbered respectively 0–15. Since 4×4 pixels are addressed as a unit, there is a sacrifice of resolution, as indicated above, but, for reasons also indicated above, it is of no particular consequence. In FIG. 8e (and also in the output portion of FIG. 8f), a space that is not blackened corresponds to "0", and a space that is blackened corresponds to "1". There is, of course, only one combination of all "1's". These two possibilities correspond to "0" and "15", respectively, in FIG. 8e. There are four different ways in which one darkened space can be arranged, corresponding to boxes 1, 2, 4 and 8 in FIG. 8e. Similarly, there are four ways in which 3 darkened spaces (i.e., one space that is not darkened) can be arranged, namely those corresponding to 7, 11, 13 and 14 in FIG. 8e. Finally, there are 6 ways in which 2 darkened spaces (corresponding to 2 spaces that are not darkened) can be arranged: these correspond to 3, 5, 6, 9, 10 and 12 in FIG. 8e.

Figure 8F:
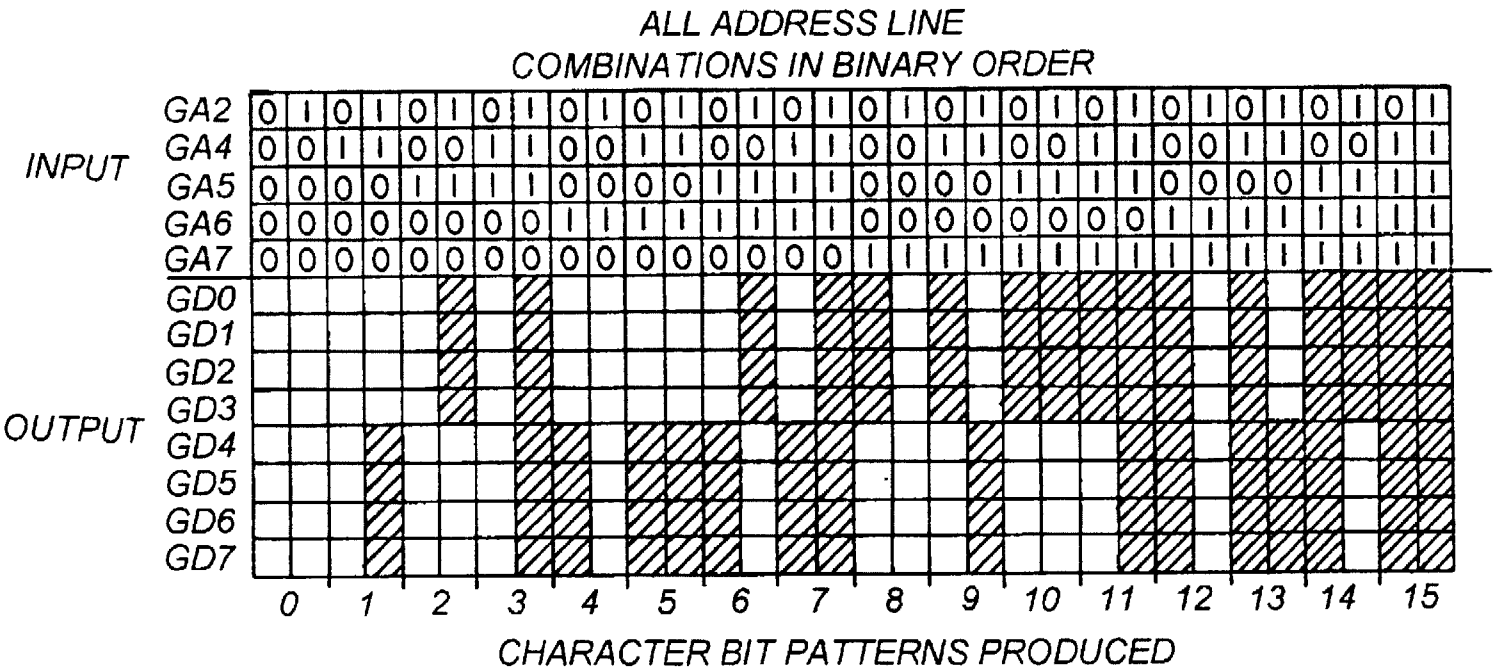
FIG. 8f is a truth table relating the inputs and outputs of FIG. 8d to each other and to the 16 character cell definitions of FIG. 8e.

FIG. 8f is a truth table showing the address lines in a logical order and the data values they produce to make the 16 character shapes. In FIG. 8e, all address line combinations are shown in binary order. Of course, the order can be changed and is not critical. The character bit patterns produced can be viewed with the left side of FIG. 8f up to see the character shapes from the same perspective as in FIG. 8e. When the input line GA 2 is set to "0" it designates the top half of the pattern and when set to "1" designates the bottom half.

The OR gate 205 produces an output which is supplied to the four input terminals of the buffer 111 that relate to the output lines GD 4–GD 7, and the OR gate 206 produces an output which is supplied to the four input terminals of the buffer 111 that relate to the outputs GD 0–GD 3. Accordingly, in FIG. 8f, in the case of pattern "1", for example, the inputs GA 4–GA 7 of respectively "1", "0", "0", "0" correspond to no shading in the third quadrant of the output; but when GA 2 changes to "1", the same inputs GA 4–GA 7 of "1", "0", "0", "0" corresponds to shading in the third quadrant. In a similar way, the inputs GA 2 and GA 4–GA 7 shown in FIG. 8f produce the outputs on GD 0–GD 7 shown in FIG. 10f to form all of the bit patterns "0" through "15". These patterns are shown more pictorially in FIG. 8e.

The operation of the circuitry of FIGS. 8a–8d will now be described in connection with the flow chart of FIG. 9.

Figure 9A:
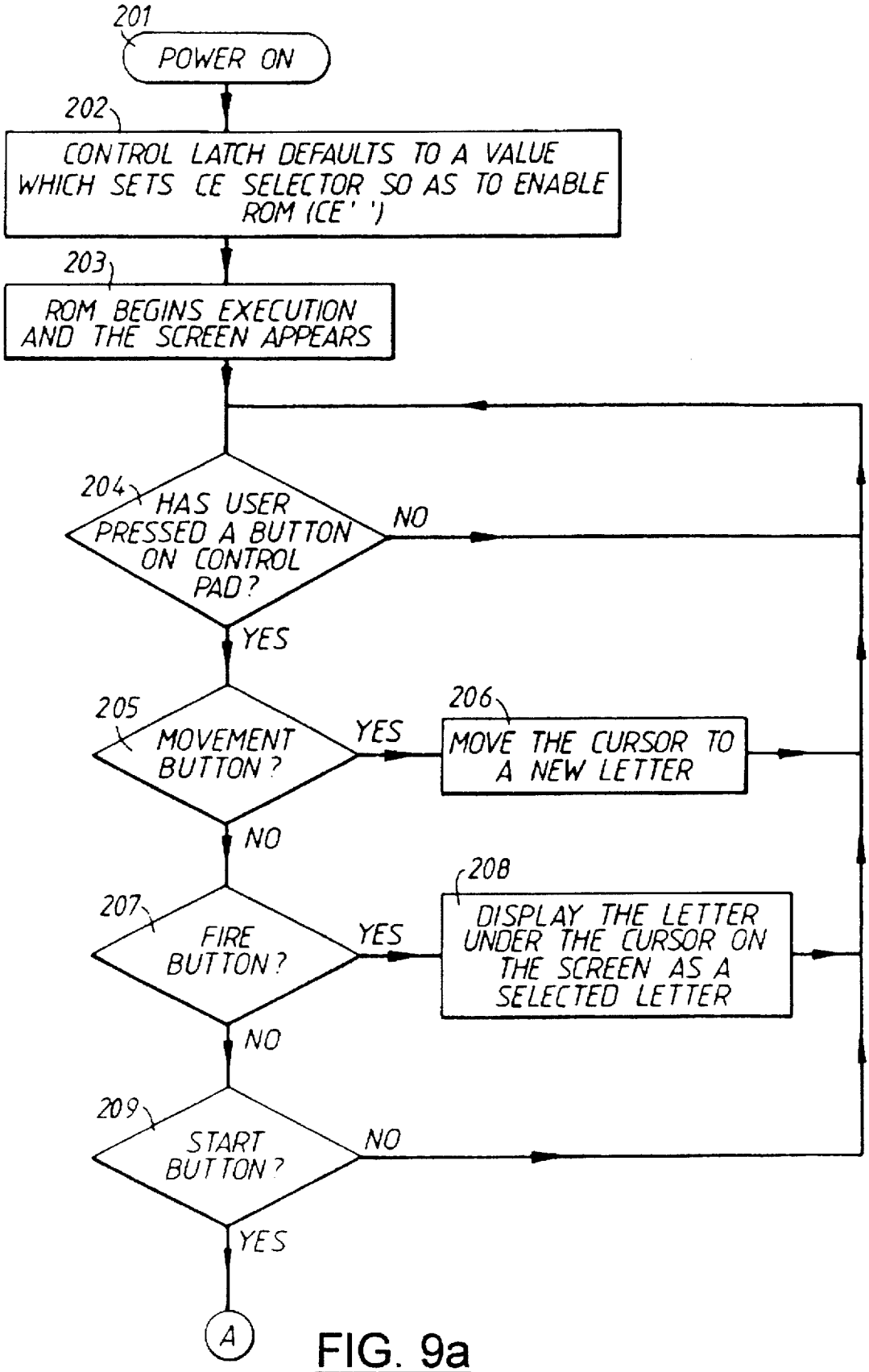
FIGS. 9a, 9b and 9c when taken together form a flow chart showing the steps of a process performed with the aid of the circuitry of FIGS. 8a–8d.
Figure 9B:
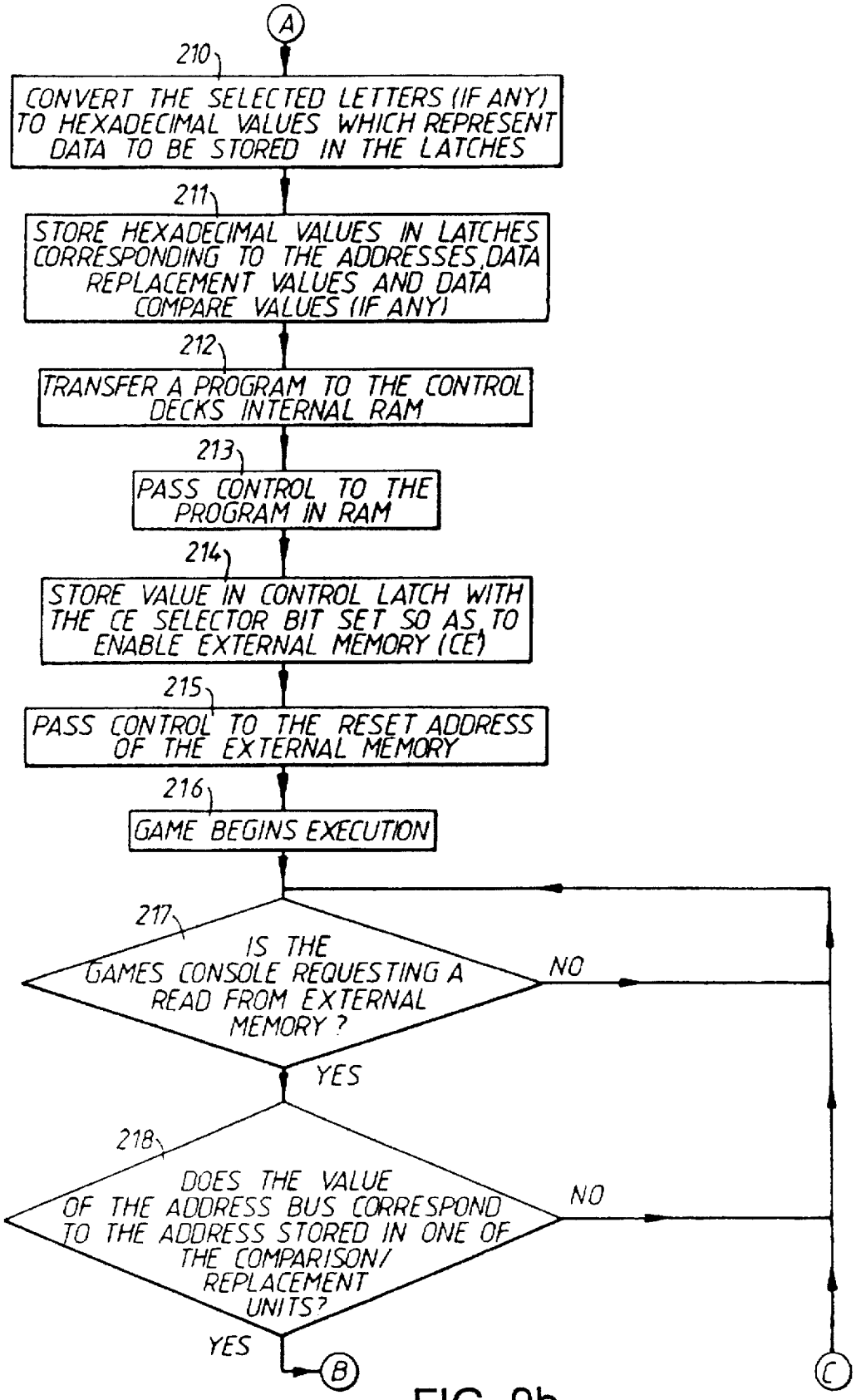
Figure 9C:
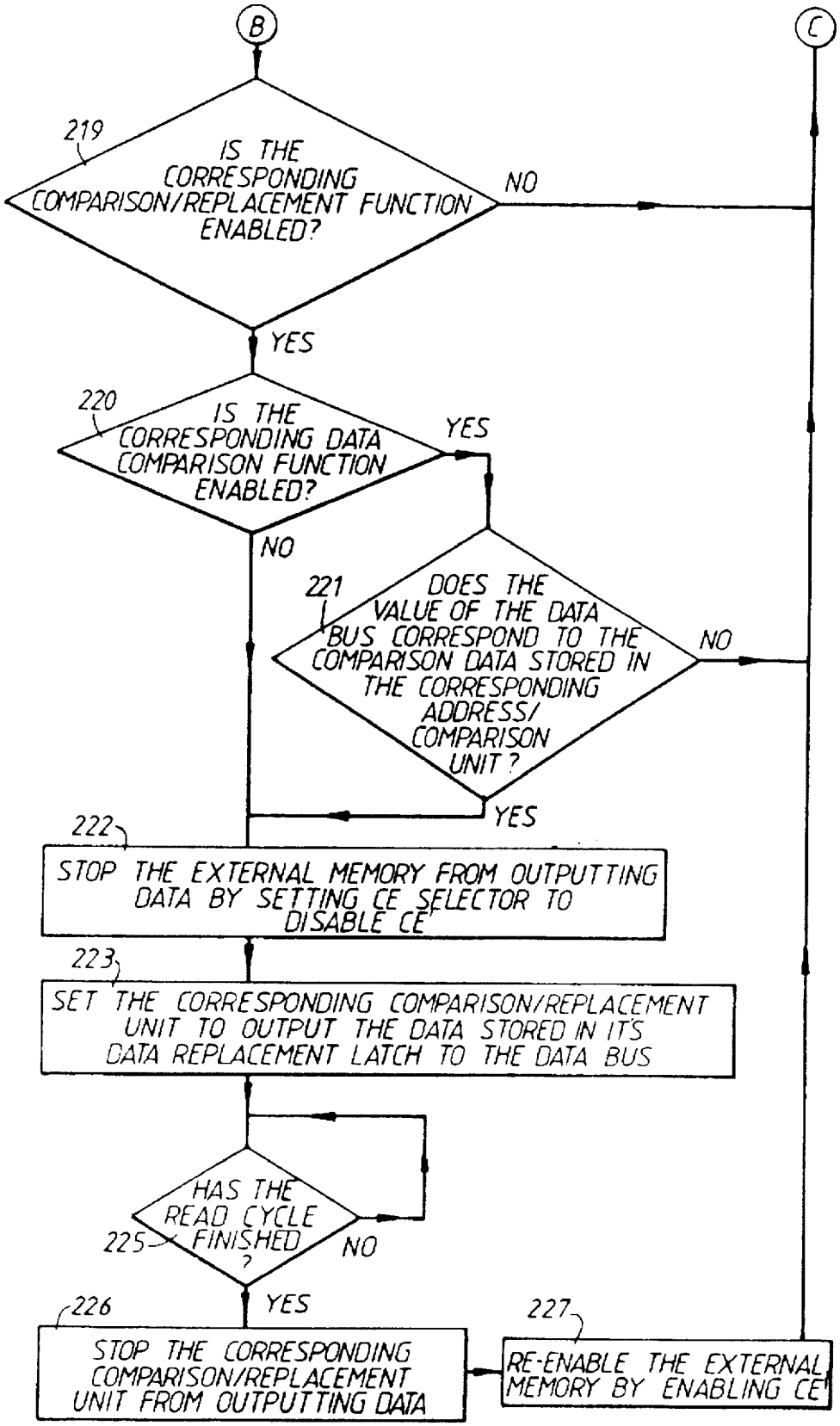

FIGS. 9a, 9b and 9c when taken together form a flowchart showing the process performed with the aid of the circuitry of FIGS. 8a–8d. In FIGS. 9a–9c, steps 201 and 202 are performed by the power-on circuit, steps 203–213 by the interfacing ROM, steps 214 and 215 by the program in the internal memory of the games machine, and steps 217–227 by the interfacing ASIC. When power is turned on as indicated at step 201 in FIG. 9a, the process moves to step 202, wherein the control latch defaults to a value which sets the CE selector 90 so as to enable the ROM 96 on line CE" 98. The process then moves to step 203, wherein the ROM 96 begins execution and the screen in accordance with the invention appears on the display screen on which the game is displayed.

At step 204, the program in the ROM determines whether the user has pressed a button on the control pad. If the user is not pressed such a button, the program loops back and makes the determination repeatedly until it is found that user has pressed a button on the control pad. When an affirmative determination is made, the program moves to step 205, wherein a determination is made whether a movement button has been pressed by the user. If so, then at step 206 the program moves the cursor to a new letter and then reverts to step 204. If no movement button has been pressed, the program determines whether a fire button has been pressed by the user. If so, the program causes display of the letter under the cursor on the screen as a selected letter and then loops back to step 204. If the fire button is not found to have been pressed, the program determines at step 209 whether the start button has been pressed. If not, the program loops back to step 204.

When the start button has been pressed, then, as FIG. 9b shows, the program converts the selected letters (if any) to hexadecimal values which represent data to be stored in the latches. At step 211, the program then stores hexadecimal values in latches corresponding to the addresses, data replacement values, and data compare values (if any). Then, at step 212, a program is transferred to the control deck's internal RAM. At step 213, control is passed to the program in the RAM.

At step 214, the program in internal memory stores a value in the control latch with the CE selector bit set so as to enable the external memory on the line CE' 94 (FIG. 8a) and conditionally enable the comparison/replacement units 1, 2, 3 and disable graphic emulation. At step 215, control is passed to the reset address of the external memory and, at step 216, the game program begins execution.

At step 217, the device determines whether the game control is requesting a read from the external memory. If not, it loops back until an affirmative determination is made. When an affirmative determination is made, the device determines whether the value of the address bus corresponds to the address stored in one or the comparison/replacement units 1, 2 and 3. If not, the process loops back to step 217. When an affirmative determination is made, the process advances to step 219 (FIG. 9c).

At step 219, a determination is made whether the corresponding comparison/replacement function is enabled. If not, the process loops back to step 217. When it is found at step 219 that the corresponding comparison/replacement function is enabled, then, at step 220, a determination is made whether the corresponding data comparison function is enabled. If it is determined that the function has been enabled, the process advances to step 221, where a determination is made whether the value of the data bus corresponds to the comparison data stored in the corresponding address/comparison unit. If no such correspondence is found, the process loops back to step 217.

If at step 220 the corresponding data comparison function is not enabled, or if at step 221 the value of the data bus is found to correspond to the comparison data stored in the corresponding data and comparison latch, the process moves to step 222. At step 222, the external memory is prevented from outputting data by setting the CE selector to disable the line CE' 94 (FIG. 8a) via the terminal REF. Then, at step 223, the corresponding comparison/replacement unit is set to output the data stored in its data replacement latch to the data bus.

At step 225, a determination is made whether the read cycle is finished. If not the process stays in the loop at step 225 until it is determined that the read cycle is finished. When the read cycle is finished, the process advances to step 226. At step 226, the corresponding comparison/replacement unit is prevented from outputting data. Then, at step 227, the external memory is re-enabled by enabling the line CE' 94 (FIG. 8a). The process then loops back to step 217 in FIG. 9b.

The versatility of the described interfacing devices is demonstrated by short extracts from typical computer games programs given in examples I and II below.

In these examples, the four-digit numbers (e.g. 3000) appearing in the left-hand column are coded addresses; they are followed by coded instructions (e.g. DEC1000) from the addressed storage location of the external memory. In fact, in the examples given, each instruction consists of two or three bytes. An explanation of the function of each instruction is given in the right-hand column.

EXAMPLE I

This section of the program causes a unit, e.g. a plane or car, to move at a particular speed.

| ADDRESS | INSTRUCTION | EXPLANATION |
|---|---|---|
| 3000 | DEC 1000 | This reduces the content of address 1000 by 1 (e.g. a value 28 changes to 27). |
| 3003 | BNE 300D | If the value of the last step is not zero the program returns to address 3000. |
| 3005 | LDA 50 | This puts value 50 (from the storage location corresponding to address 3006) into a variable "A." |
| 3007 | STA 1000 | This puts the valve of variable A (i.e. 50) into address 1000. |
| 300A | JSR "MOVE UNIT" | This calls up subroutine "MOVE UNIT" which causes the unit to move. |
| 300D | JMP 3000 | The section of the program set out above is repeated. |

This section of the program causes the subroutine "MOVE UNIT" to be executed when the program steps corresponding to addresses 3000 to 3003 have been executed 50 times.

If, therefore, the interfacing device sets the selected address at 3006 and sets the selected data value at 10, then the value 50 in variable "A" in the processor (the value in the corresponding storage location of the memory) is replaced by the user-selected value (10 in this example). This causes the subroutine "MOVE UNIT" to be executed when the program steps corresponding to addresses 3000 to 3003 have been executed 10 times instead of 50 times.

Consequently the playing unit is caused to move more quickly.

EXAMPLE II

In this game, a player is required to complete a given number of laps of a track.

| ADDRESS | INSTRUCTION | EXPLANATION |
|---|---|---|
| 2000 | INC 1200 (LAP COUNT) | This increments the content of address 1200 by one (increasing the lap count by one every time a player completes a lap). |
| 2002 | LDA 1200 | This puts the content of address 1200 into variable A (i.e. it puts the current lap count into variable A). |
| 2004 | CMP 3 (LAP 3?) | This compares the last value of the lap count with 3 (the value derived from the storage location corresponding to address 2005) |
| 2006 | BNE 200A | If the answer is no (i.e., the comparison shows an inequality), then the program goes to 200A: otherwise it continues on. |
| 2008 | JMP "RACE COMPLETE" | This causes a jump to the "RACE COMPLETE" parts of the program. |

This number of laps required to be completed by the player is set at the value 3 derived from the addressed storage location of the memory. If, therefore, the interfacing device sets the selected address at 2005 and sets the selected data value at 7, say, then the value 3 in variable A in the processor (the value derived from the memory) is replaced by the designated value, 7 in this example.

This requires the player to complete 7 instead of 3 laps, thereby increasing the difficulty of the game.

Clearly, these examples are merely illustrative of the many different modifications that can be effected using the interfacing device or the invention. The examples given effect a change of a single byte in a data table so as to change selected game variables such as screen color, sound volume, number of players, number of laps, time intervals, etc.

However, changes can alternatively, or additionally, be made to the instructions themselves, e.g. to change an instruction to increase a value to an instruction, to decrease a value, to change an instruction to perform a particular task to one that requires no action, to change a branch instruction (BEQ to BNE, say), and so on.

Although the described embodiments enable recognition of a single address and substitution of data corresponding thereto, the invention also embraces recognition of two or more different addresses and substitution of the respective data corresponding thereto.

Also, although the specific embodiments relate to a detachable interfacing device, the device can alternatively be incorporated into the processing unit as an integral part thereof.

We claim:

1. An interfacing device for connecting a processing unit of a computer games system to an external data storage medium so as to enable the processing unit to address, and receive data from, different storage locations in the external data storage medium, said interfacing device being removably connectable to the processing unit and to the external data storage medium and comprising means responsive to the processing unit for recognition of a selected address and means responsive to said recognition for modification of data processed by the processing unit.

2. An interfacing device according to claim 1 wherein said recognition means includes means for comparing the selected address with an address from the processing unit and said modification means effects the modification if the compared addresses are the same.

3. An interfacing device according to claim 1 or 2 wherein the selected address is an address selected by the user.

4. An interfacing device according to clam 3 wherein the modification means comprises user-operable selection means for generating the selected address and user-selected data and means for supplying the user-selected data to the processing unit in substitution for the data in the addressed storage location of the external data storage medium if the compared addresses are the same.

5. An interfacing device according to claim 4 wherein the data supplying means includes a semiconductor switching device responsive to an output from the comparing means.

6. An interface device according to claim 4 wherein the user-operable selection means comprises a first plurality of user-operable switching devices for setting the selected address and a second plurality of user-operable switching devices for setting the user-selected data.

7. An interfacing device according to claim 6 wherein the switching devices are user-operable rotary switches.

8. An interfacing device according to claim 7 wherein the rotary switches are 16-position rotary switches.

9. An interfacing device according to claim 6 wherein the first plurality comprises four said switching devices and the second plurality comprises two said switching devices.

10. An interfacing device according to claim 1 or 2 wherein said selected address is preselected.

11. An interfacing device according to claim 10 wherein the modification means effects the modification in response to recognition of one of a plurality of preselected addresses in accordance with identification data from the external data storage medium.

12. An interfacing device according to claim 11 wherein the recognition means includes a memory for storing said plurality of preselected addresses together with a plurality of corresponding preselected data, and means for comparing said one address with an address from the processing unit, and said modification means includes means for supplying to the processing unit the preselected data, corresponding to the one address, in substitution for the data in the external data storage medium, if the compared addresses are the same.

13. An interfacing device according to claim 12 wherein the preselected data corresponding to one or more of said preselected address each may be user-selected from a corresponding set of possible values, said interfacing device further including user-operable means for selecting from each said corresponding set.

14. An interfacing device according to claim 1 wherein the modification means effects a modification in response to recognition of any one of two or more selected addresses from the processing unit.

15. In combination, an interfacing device according to claim 1, the processing unit and the external data storage medium.

16. An interfacing device according to claim 1 wherein the modification means comprises a [read-only memory] *data source* and the modification means interrupts the processing unit in response to said recognition and [banks] *presents* data from said [read-only memory into] *data source to* said processing unit in order to modify an internal memory in the processing unit.

17. An interfacing device according to claim 16 wherein said selected address is user-selected.

18. An interfacing device according to claim 16 wherein said selected address is preset in said recognition means.

19. An interfacing device according to claim 16 wherein said recognition means comprises bus means connected to said processing unit, register means, and comparator means connected to said bus means and said register means, said register means being adapted to store a value corresponding to said selected address and said comparator means producing an output indicative of correspondence between an address on said bus means and said stored value.

20. An interfacing device according to claim 16, wherein said recognition means includes comparator means for comparing in selected address with an address from the processing unit and said modification means comprises switch means responsive to said comparator means for enabling access by said processing unit to data in said [read-only memory] *data source*.

21. An interfacing device according to claim 20 wherein said switch means comprises a semiconductor device.

22. An interfacing device according to claim 1 wherein said recognition means also recognizes a selected data value, and said modification means effects said modification of data only if said recognition means recognizes both said selected address and said selected data value.

23. An interfacing device according to claim 1 further comprising case means containing said recognition means and said modification means, said case means including a handle portion.

24. An interfacing device according to claim 23, said external data storage medium being connectable thereto in such a manner as to be positioned underneath said handle portion, and said handle portion being formed with a thumb rest protruding from an upper portion thereof, said thumb rest being formed with a concave portion for accommodating the thumb of a user, whereby an assembly of said interfacing device and said external data storage medium can conveniently be grasped with a thumb engaging said thumb rest and fingers engaging said external data storage medium for connection of said assembly to said processing unit of said computer games system.

25. An interfacing device according to claim 24 wherein said protruding thumb rest prevents connection of said assembly to said processing unit in an up-side-down relation.

26. An interfacing device according to claim 24 wherein said recognition means and said modification means are incorporated in a printed circuit board that has sufficient thickness that said connection of said assembly to said processing unit of said computer games system can be effected with a movement that is rectilinear.

27. An interfacing device according to claim 1 that operates in a latch-setting mode wherein a user can determine said selected address and replacement data and further operates in an active mode wherein said recognition means recognizes said selected address and said modification means effects said modification of data in response to said recognition.

28. An interfacing device according to claim 27 wherein a display screen used with the interfacing device has a plurality of character cells each measuring a plurality of display screen pixels in each of two mutually orthogonal directions.

29. An interfacing device according to claim 28 wherein, at least in the latch setting mode, a plurality of pixels in each cell are controlled as a unit.

30. An interfacing device according to claim 29 further comprising a graphic generating means for generating said graphic display, said display screen presenting said graphic display, at least in said latch-setting mode.

31. An interfacing device according to claim 30 wherein said graphic generating means comprises a plurality of gate means responsive to graphic address signals and a graphic output buffer responsive to said gate means, said graphic output buffer producing graphic data outputs that control said pixels, whereby said graphics display is generated without the provision of a read-only memory.

32. A method or playing a computer game controlled by a computer games system having an internal processing unit and an external data storage medium, comprising the following steps performed outside the internal processing unit:

comparing an address from the processing unit with a selected address; and modifying data processed by the processing unit whenever the compared addresses are the same.

33. A method according to claim 32 wherein aid selected address is selected by a player of the game.

34. A method according to claim 32 wherein aid selected address is presettable.

35. A method according to claim 32 wherein the modification of data processed by the processing unit comprises the step of replacing data being transmitted to the processing unit from the external data storage medium.

36. A method according to claim 32 wherein the modification of data processed by the processing unit comprises the step of supplying to said processing unit data from a source external to both the external data storage medium and the processing unit.

*37. An interfacing device for interconnecting a processing unit of a computer games system and an external data storage medium of a kind which is directly connectable to the processing unit, the interfacing device being removably connectable to the processing unit and to the external storage data storage medium to enable the processing unit to address, and receive data from, different data storage locations in the external data storage medium, and the interfacing device comprising:*

*means for conveying addresses from an address output of the processing unit to an address input of the external data storage medium;*

*recognition means for recognizing a selected address from the processing unit; and*

*modifications means responsive to recognition of said selected address for causing the processing unit to process different data than the processing unit would process if the external data storage medium is directly connected to the processing unit.*

*38. A method of operating a computer games system in which an interfacing device interconnects a processing unit*

*of the computer games system and an external data storage medium of a kind which is directly connectable to the processing unit, the interfacing device being removably connectable to the processing unit and to the external data storage medium to enable the processing unit to address and receive data from different data storage locations in the external data storage medium, the method including the following steps performed in the interfacing device:*

*conveying addresses from an address output of the processing unit to an address input of the external data storage medium;*

*recognizing a selected address from the processing unit addressing a storage location in the external data storage medium; and*

*in response to recognition of said selected address, causing the processing unit to process different data than the processing unit would process if the external data storage medium is directly connected to the processing unit.*

* * * * *